(12) United States Patent
Wolf et al.

(10) Patent No.: US 8,368,276 B2
(45) Date of Patent: Feb. 5, 2013

(54) POLYPHASE ELECTRICAL MACHINE

(75) Inventors: Gert Wolf, Affalterbach (DE); Norbert Pfitzke, Schwieberdingen (DE); Thomas Berger, Ditzingen (DE); Eberhard Rau, Korntal-Muenchingen (DE); Alexander Shendi, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 505 days.

(21) Appl. No.: 12/305,816

(22) PCT Filed: Jan. 29, 2008

(86) PCT No.: PCT/EP2008/051038
§ 371 (c)(1),
(2), (4) Date: Jul. 19, 2010

(87) PCT Pub. No.: WO2008/092858
PCT Pub. Date: Aug. 7, 2008

(65) Prior Publication Data
US 2010/0283349 A1 Nov. 11, 2010

(30) Foreign Application Priority Data
Jan. 29, 2007 (DE) .......................... 10 2007 005 742

(51) Int. Cl.
*H02K 1/00* (2006.01)
(52) U.S. Cl. ........................................ 310/195; 310/179
(58) Field of Classification Search .......... 310/179–180, 310/184–189, 195, 198
See application file for complete search history.

(56) References Cited

U.S. PATENT DOCUMENTS

| | | | |
|---|---|---|---|
| 6,013,968 A | | 1/2000 | Lechner et al. |
| 6,661,146 B2 * | | 12/2003 | Oohashi et al. ............... 310/180 |
| 6,791,228 B2 * | | 9/2004 | Hashiba et al. ............... 310/201 |
| 7,067,949 B2 * | | 6/2006 | Kometani et al. ............. 310/184 |
| 7,863,794 B2 * | | 1/2011 | Fujita et al. ................... 310/198 |
| 8,008,828 B2 * | | 8/2011 | Koike ............................ 310/198 |
| 2002/0180299 A1 * | | 12/2002 | Oohashi et al. ............... 310/184 |
| 2004/0012292 A1 * | | 1/2004 | Kometani et al. ............. 310/184 |
| 2004/0251766 A1 * | | 12/2004 | Kometani et al. ............. 310/216 |
| 2006/0208594 A1 | | 9/2006 | Kashihara et al. |

FOREIGN PATENT DOCUMENTS

| | | |
|---|---|---|
| EP | 1 296 439 | 3/2003 |
| EP | 1 324 462 | 7/2003 |
| JP | 9-103052 | 4/1997 |
| JP | 3061043 | 9/1999 |
| JP | 2002-199677 | 7/2002 |
| JP | 2003-88021 | 3/2003 |
| JP | 2005-237057 | 9/2005 |
| WO | 2006 122 985 | 11/2006 |

OTHER PUBLICATIONS

International Search Report, PCT/EP2008/051038, dated May 8, 2008.

* cited by examiner

*Primary Examiner* — Thanh Lam
(74) *Attorney, Agent, or Firm* — Kenyon & Kenyon LLP

(57) ABSTRACT

A polyphase electrical machine, in particular, a polyphase generator, includes a stator which features a core body having a circumferential slot pitch, and a winding configuration having a plurality of windings. It is provided that each winding and each slot of the group of slots that extends over one pole pitch is assigned to one of the phases, and the windings have winding sections that lie in assigned slots and between which, in each case, a winding-head connection is formed, the winding-head connections of different windings being disposed radially in layers relative to each other, and the number of phases being five. A method for producing a polyphase electrical machine is also provided.

39 Claims, 24 Drawing Sheets

POLYPHASE ELECTRICAL MACHINE

FIELD OF INVENTION

The present invention relates to a polyphase electrical machine, in particular, a polyphase generator, having a stator which features a core body having a circumferential slot pitch, and a winding configuration having a plurality of windings forming phases. The present invention also relates to a method for producing a corresponding polyphase electrical machine.

BACKGROUND INFORMATION

A polyphase electrical machine of the type indicated at the outset is known, for example, as an alternating-current generator. This alternating-current generator has a stator having a core body (stator iron) in the form of a laminated stator core, into slots of which, windings for three, two times three or six phases are inserted. The windings are staggered relative to each other. In the case of a three-phase generator, an unwanted magnetic noise develops due to electromagnetic forces. To reduce this magnetic noise, special winding configurations are provided which, for example, are made up of two electrically separate subsystems. Each subsystem is made up of three phases which are shifted by 120 electrical degrees relative to each other. For each phase of the first subsystem, a phase of the second subsystem is shifted by 30 electrical degrees. For instance, the windings of each of the two subsystems are interconnected in star or delta. Each interconnection point (current output or winding termination) of a winding is interconnected with a rectifier bridge. Altogether, six rectifier bridges are used. The windings used are prefabricated windings which, for example, are created by forming out star-shaped winding units having rectangular peripheral sections. Subsequently, these winding units are introduced into the core body in the form of a laminated stator core. In the case of a two times three-phase system, six of these star-shaped winding units are introduced, for each phase of a first three-phase system, a phase of the other three-phase system being present which is shifted by 30 electrical degrees. Due to the high number of phases when working with six-phase and two times three-phase electrical machines—given the same number of magnetic poles of an associated rotor—a higher number of slots results than for electrical machines having a lower number of phases. However, a high number of slots limits the diameter of the winding wires used in relation to the diameter of the stator. Furthermore, an electrical machine having a higher number of phases must be manufactured with greater precision.

SUMMARY OF THE INVENTION

In the polyphase electrical machine built according to the present invention, it is provided that in the stator, each winding and each slot of a group of slots that extends over one pole pitch is assigned to one of the phases, and the windings have winding sections that lie in assigned slots and between which, in each case, a winding-head connection is formed, the winding-head connections of different windings being disposed radially in layers relative to each other, and the number of phases being five. Such a setup has an advantage that both the magnetic noise and the flow-generated noise are reduced. A further advantage is that the ripple of the unidirectional generator voltage decreases, and power output and the efficiency factor are thereby improved. Another benefit is that one may take advantage of the simple design of the machine to employ a cost-effective manufacturing method, and in so doing, to obtain an even better construction quality. For example, prefabricated windings are used to form a winding configuration of the electrical machine according to the present invention. The windings may be produced by machine and mounted, e.g., inserted, pulled in or slipped into the core body (the stator iron) by machine. The windings are disposed radially and layered with respect to each other in the circumferential direction. A five-phase electrical machine allows a larger wire diameter compared to an electrical machine having a two times three-phase system or a six-phase electrical machine, since when working with the same stator diameter, the smaller number of slots results in a larger slot area, given a correspondingly identical number of poles and winding connections. Due to the larger wire diameter, the robustness and mechanical loading capability of the electrical machine are higher. Moreover, the smaller number of slots allows higher manufacturing tolerance limits. At the same time, the acoustic behavior of a five-phase electrical machine is more favorable than for a three-phase electrical machine. Radial position is to be understood as the exact position in the radial direction for the winding in the winding heads.

In particular, the respective winding-head connections of a winding are disposed in an approximately uniform radial position that is specific for each winding.

Advantageously, the number of slots corresponds to a multiple of the number of phases. In this manner, what is referred to as a diametral (full-pitch) winding is possible, which yields higher performance.

According to a further development of the present invention, the number of radial positions corresponds to the number of phases or to a multiple of the number of phases. Given a number of phases of five, the number of radial positions of the winding-head connections is, in particular, likewise five, so that an especially simply constructed and robust winding configuration is obtained.

It is further provided that the windings are simple windings or distributed windings. In the case of a simple winding, after emerging axially from the slot, the winding-head connections adjoining the winding sections run in one circumferential direction, i.e., essentially in one circumferential direction. In the case of a distributed winding, after emerging axially from the slot, the winding-head connections adjoining the winding sections run essentially uniformly distributed in both circumferential directions. Pull-in windings in the form of simple windings may be introduced easily into the core body. Since each of the winding-head connections is introduced in a radial position assigned to it, the filling of the slots with the associated winding sections is only slight when working with simple windings, however. The filling of the slots is increased by the use of distributed windings. Given the same space-filling factor, higher mounting forces are obtained in response to the filling with simple windings compared to the distributed winding, resulting in a greater likelihood that wire damage will occur.

In particular, it is provided that the windings are in the form of lap windings or wave windings. Both are winding types which are able to be introduced into the core body by machine.

Moreover, each of the slots has a maximum slot width which is greater than two times the diameter of a winding wire from which the windings are wound. In this manner, given the simultaneous presence of a slot insulation, in one slot two winding sections may be placed side-by-side in the circumferential direction in the same radial layer. This optimizes the use of distributed windings.

In particular, at their radial inner end, each of the slots has a slot opening whose slot-opening width is less than two times the diameter of the winding wire. This only partially open slot having minimal slot-opening width retains the wires, introduced into the slot, for the winding sections of the windings lying, in particular, side-by-side in pairs, a sufficiently small slot-opening width being obtained.

It is further provided that the maximum slot width is less than a yoke height of the core body taking the form of a laminated stator core.

According to a further development of the present invention, the ratio of the maximum slot width to the yoke height of the laminated stator core lies in the range between 0.5 and 0.9. The following therefore applies for the ratio of slot width O to yoke height R: $0.5<O/R<0.9$.

In particular, each of the slots has a slot depth, the ratio of the yoke height to the slot depth lying in the range between 0.3 and 0.5. The following therefore applies for the ratio of yoke height R to slot depth Q: $0.3<R/Q<0.5$.

Advantageously, the ratio of the yoke height to the circumference of the stator is less than 0.015. In the case of radially inner slots, the yoke height is the radial height between the outside diameter of the core body and the slot bottom. This yields an optimized bending behavior for the flat stator core—further provided in refinement of the present invention—which is bent into a round shape after insertion of the windings.

Advantageously, a rotor is provided having a number of poles which, multiplied by the number of phases, yields the number of slots. For example, if, in the case of five phases, the stator is designed for a rotor having twelve poles, a number of 60 slots then results.

Moreover, it is provided that the rotor features a magnetically active part having an outside diameter and having an axial length, the outside diameter being greater than the length of the magnetically active part. The axial length of the magnetically active part of the rotor is what is referred to as the (iron-) core length of the rotor. It is obtained from the outer axial distance between two magnet-wheel halves with the core situated in between, that is surrounded by a ring coil.

Advantageously, at least one radial-flow fan is provided, which is mounted at an axial end face of the rotor, the radial-flow fan generating a predominantly radial air flow which is directed toward a part of the winding-head connections of the windings forming two winding heads. The stator is cooled over the relatively large surface of the winding head by this air flow.

The rotor has claw-shaped magnetic poles, which extend axially inwards from the magnet wheel. The claw-like pole fingers (claw fingers) mutually engage as south pole and north pole, and cover the ring-coil-shaped exciter winding located on the pole core.

According to one further development of the present invention, each two adjacent engaging claw fingers of different polarity have an axial spacing of their claw fingertips, the axial spacing of the claw fingertips being between 0.7-fold and 1.0-fold the axial core-body length.

Moreover, the claw fingers have a chamfer at their edges that lead and/or edges that trail with respect to the direction of rotation. The magnetic noise of the electrical machine may be further reduced by a suitably selected chamfer at the edges.

It is further provided that the rotor is designed in a claw-pole type of construction having two magnet-wheel halves and a core situated axially between the magnet-wheel halves, the essentially trapezoidal claws having pole surfaces facing the stator bore.

According to one refinement of the present invention, permanent magnets to compensate for leakage flux are disposed between the claw fingers. The permanent magnets are used to reduce the leakage flux between two adjacent pole fingers of different magnetic polarity, or even to increase the main flux of the magnetic circuit.

It is also provided that the core body has an axial core-body length, and the permanent magnets have a uniform axial magnet length, the axial magnet length being between 0.6-fold and 1.2-fold the axial core-body length.

In particular, a rectifier is provided in bridge connection, to which the windings are connected. In so doing, the windings may be interconnected in variable manner.

Moreover, the bridge connection includes ten diode elements. In the case of a polyphase machine taking the form of a generator, the bridge connection is, in particular, a 10-pulse bridge rectifier for a 5-phase machine, that has ten diode elements. In particular, it is provided that the windings of the winding configuration are connected in fewer than ten electrical interconnection points to the bridge connection. An interconnection in two separate systems, as in the case of the two times three-phase circuit is eliminated.

Advantageously, the windings are interconnected in a pentagram configuration. This means that the windings are connected to each other in such a way that they are arranged according to a pentagram (five-pointed star). In the case of five phases, five interconnection points result. Given the interconnection of the windings according to a pentagram, phase angle α of the directly interconnected windings corresponds to approximately 36° or to exactly 36°.

Alternatively, it is provided that the windings are interconnected in a short-pitched star configuration, each of the windings being made up of two winding parts short-pitched relative to each other. The short-pitched star configuration has five interconnection points, as well as one star point in common. The winding parts connected up directly to the star point are interconnected in succession, shifted by 72 electrical degrees. Between each of the interconnection points and the star point, two winding parts connected in series are disposed in the core body in such a way that the phase-shifted winding parts, due to an insertion in the slots that is shifted in the circumferential direction, have a phase angle α' of approximately or exactly 36° relative to each other.

The present invention further relates to a method for producing a polyphase electrical machine, especially an electrical machine indicated above, having a stator which features a core body having a circumferential slot pitch. It is provided that the number of phases is five, and to produce the stator, a number of windings corresponding to the number of phases or a multiple of the number of phases are mounted sequentially in the core body, the windings having winding sections that lie in assigned slots and between which, in each case, a winding-head connection is formed, and the winding-head connections of the individual windings are disposed radially in layers relative to each other. The stator is subsequently inserted into the machine frame. When working with such a method, the windings and/or the stator is/are prefabricated in such a way that a simple and effective introduction of the windings is possible. In order to obtain the least magnetic noise possible, the number of phases is five, the number of windings to be inserted being five or a multiple of five. In particular, the windings are joined in succession. The number of jointing operations corresponds to the number of phases or a multiple thereof. Successive radial positions are thereby attained. The number of windings to be mounted individually corresponds to the number of phases or a multiple of the number of phases, which is why the number of radial positions likewise corresponds to the number of phases or a multiple thereof. In an expedient refinement of the present invention, the windings directly adjacent radially in the winding head are mounted in the core body so that they are shifted relative to each other by a predefined number of slot pitches, the "slot offset".

Advantageously, the number of radial positions corresponds to the number of phases.

Moreover, the windings are simple windings. In the case of a simple winding, after emerging axially from the slot, the winding-head connections adjoining the winding sections run in one circumferential direction, i.e., essentially in one circumferential direction.

To that end, it is provided in particular that the slot offset amounts to 5*m+4 slots, m being integrally greater than or equal to 0. The form of the winding head is therefore more uniform and the flow-generated noise is reduced.

Alternatively, the windings are distributed windings. In the case of a distributed winding, after emerging axially from the slot, the winding-head connections adjoining the winding sections run essentially uniformly distributed in both circumferential directions.

To that end, it is advantageously provided that the slot offset amounts to 5*m+1 slots, m being integrally greater than or equal to 0.

Advantageously, it is provided that the windings are in the form of lap windings or wave windings.

In expedient development of the present invention, the preparation of the stator includes the following steps:
  insertion of the windings in layers into a plane laminated stator core having two laminated-stator-core ends,
  bending round of the laminated stator core together with inserted windings and
  integral joining of the two laminated-stator-core ends, a cylindrical core body of the stator being obtained.

Due to the sequential insertion of the windings into a plane laminated stator core, the assembly process is simplified and damage to the wires forming the windings is avoided. The subsequent bending round of the laminated stator core together with inserted windings produces a core body of the stator which, in particular, has a hollow cylindrical shape. The core body thus obtained may subsequently be inserted, completely preassembled, into the machine frame.

Moreover, the winding-head connections form winding heads which are stamped prior to the insertion of the windings into the plane stator core, and assume a predefined form due to the stamping, the total radial height of all windings layered together corresponding approximately to the slot depth. The result, particularly in the case of the formation of flat windings for insertion into a plane laminated stator core, is that the winding-head connections form winding heads, of which the winding-head connections of at least one winding are stamped. In this context, the winding-head connections are disposed radially in layers.

It is further provided that the winding sections of the windings are stamped prior to insertion of the windings into the plane stator core and assume a predefined form due to the stamping, the form adapting to the slot cross-section.

In refinement of the present invention, it is further provided that, alternatively, the method for preparing the stator includes the following steps:
  prefabricating the windings from at least one continuous winding wire into a form of essentially flat, ring-shaped winding units,
  shaping of ring-shaped winding units into star-shaped winding units having winding sections, between which in each case a winding-head connection is formed, and
  successive mounting of the windings that are radially directly adjacent in the winding head, into the slots of a cylindrical core body, the windings being shifted relative to each other by a predefined number of slot pitches.

The star-shaped winding units have straight winding sections which, in this production stage, run in the radial direction, and later lie in the slots in the axial direction. Situated between the straight winding sections are winding parts which, in each case, run in the circumferential direction, and later form the winding-head connections. The predefined number of slot pitches corresponds to the "slot offset".

In this context, preferably the star-shaped winding units are split into two halves, and are twisted relative to each other by one pole pitch, in doing which, winding units for distributed windings being obtained. In the case of a distributed winding, after emerging axially from the slot, the winding-head connections adjoining the winding sections run essentially uniformly distributed in both circumferential directions. Winding units, which are initially ring-shaped and are reshaped into a star form, are split into two halves twisted relative to each other by one pole pitch, winding units for distributed windings thereby being obtained. The windings prefabricated in such a way may be produced by machine and introduced by machine into the core body, which is particularly effective and efficient.

DETAILED DESCRIPTION

Figure 1:
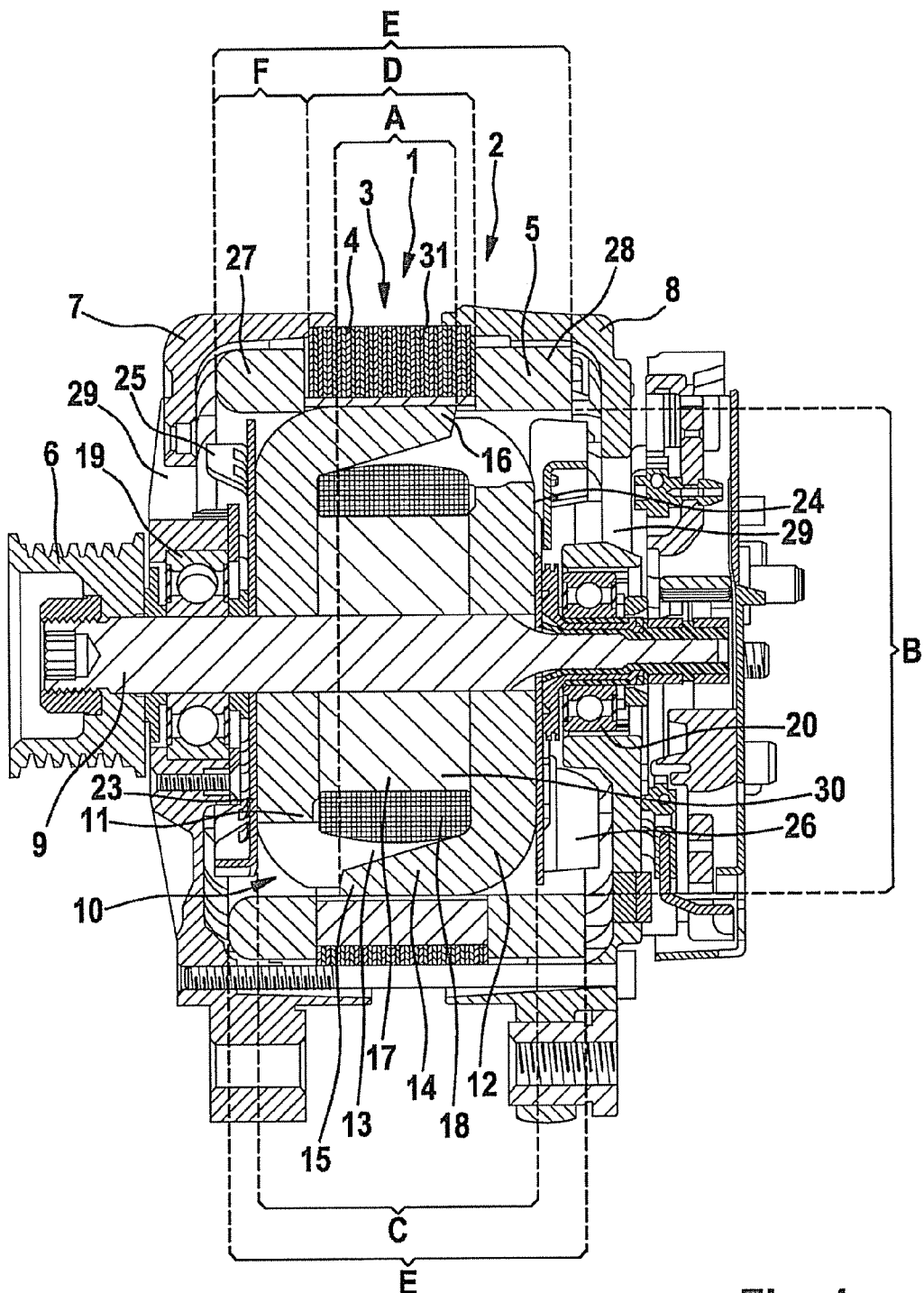
FIG. 1 shows a sectional view of an electrical machine in the form of a claw-pole generator.

FIG. 1 shows a polyphase electrical machine 2 taking the form of generator 1 as used, for example, in motor vehicles. Electrical machine 2 has a stator 3 having a core body 4 and a winding configuration 5. Stator 3 is supported by two brackets—a drive-end bracket 7 facing belt pulley 6 and a slip-ringend bracket 8. Stator 3 radially surrounds a rotor 10 disposed on a shaft 9. Rotor 10 has two claw-pole plate bars at whose periphery essentially trapezoidal claw fingers 13, 14 are disposed, in each case extending in the axial direction. Both claw-pole plate bars are disposed in the rotor in such a way that their axially extending claw fingers mesh and alternate with each other as north pole and south pole at the periphery of the rotor. Magnetically necessary claw-pole interspaces are thereby obtained between the inversely magnetized claw fingers, lying opposite each other in the circumferential direction. Claw fingertips 15, 16 of claw fingers 13, 14 opposite each other in the circumferential direction have an axial spacing A. Rotor 10 is essentially cylindrical and has a core 17 that holds the two claw-pole plate bars apart and that is surrounded by an annular exciter winding 18. Claw-pole plate bars 11, 12, core 17 and exciter winding 18 form a magnetically active part 30 of rotor 10 having a length C. Rotor 10 has an outside diameter B. Shaft 9 is supported on both sides in a roller-contact bearing 19, 20, respectively, each of which is disposed in one of the two brackets 7, 8. In this exemplary embodiment, located behind slip-ring-end bracket 8—outside of the bracket—is a 10-pulse bridge connection 21 (not shown in greater detail) and an electrical field regulator which regulates the electromagnetic excitation of rotor 10 and contacts exciter winding 18; both the 10-pulse bridge connection and the field regulator may be disposed within the slip-ring-end bracket. 10-pulse bridge connection 21 takes the form of bridge rectifier 22, and is shown as a circuit diagram in FIGS. 5 and 6. In each case a radial-flow fan 25, 26 is axially adjacent to end faces 23, 24 of rotor 10. Radial-flow fans 25, 26 are used to cool electrical machine 2, especially stator 3 via its winding heads 27, 28. To that end, fresh air is drawn in axially through air-intake orifices 29, diverted in the radial direction and directed to at least a portion of winding heads 27, 28, so that it cools them. Core body 4, formed in particular as laminated stator core 31, has an axial core-body length D. Stator length E of overall stator 3 is greater than core-body length D of core body 4 by double the axial winding-head length F.

The following function of electrical machine 2 in the form of generator 1 results: When shaft 9 is rotationally driven by a drive via belt pulley 6, rotor 10 then rotates and—in response to the flow of current through exciter winding 18—induces in winding configuration 5 of stator 3 a polyphase AC voltage which is rectified via bridge rectifier 22, in which a winding configuration 32 of stator 3 is interconnected. Alternatively, according to the representation in FIG. 20, winding configuration 32 may also be interconnected on or in the vicinity of a winding head.

Figure 2:
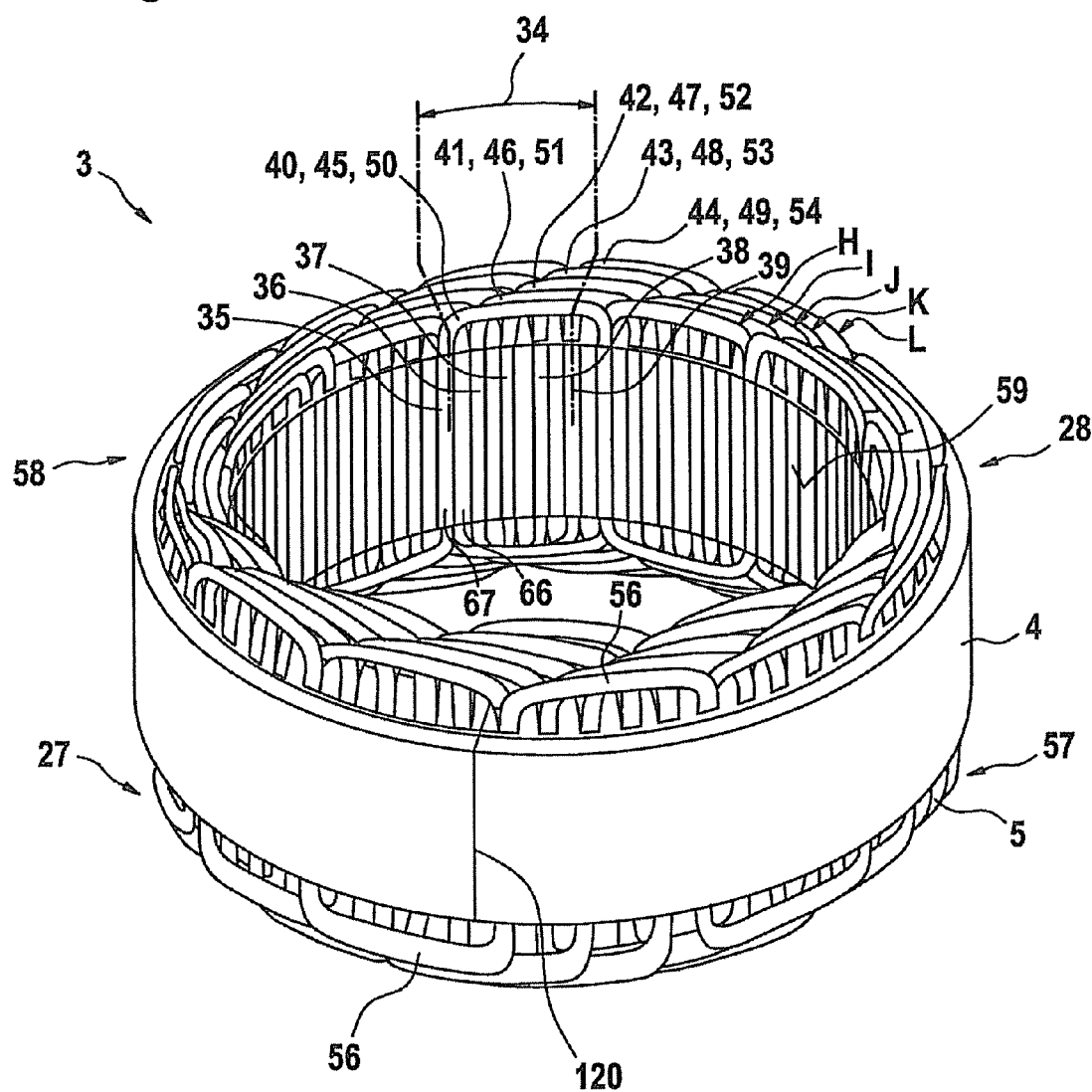
FIG. 2 shows a stator for an electrical machine having a distributed wave winding.

FIG. 2 shows stator 3 having core body 4. Core body 4 has a circumferential slot pitch made up of twelve slot groups 34. Each slot group 34 extends over one pole pitch and has 5 slots 35, 36, 37, 38, 39. Each of these slots 35 through 39 of a slot group 34 is assigned to one of the five phases. Thus, in the case of five phases, a total of 60 slots 35 through 39 is yielded for stator 3 shown in FIG. 2, this stator 3 being designed for a rotor 10 having twelve magnetic poles. Five windings 45, 46, 47, 48, 49, taking the form of distributed windings 40, 41, 42, 43, 44, are mounted in core body 4 of FIG. 2, the windings being formed as wave windings 50, 51, 52, 53, 54. Each of wave windings 50, 51, 52, 53, 54 is constructed the same, but inserted in slots 35, 36, 37, 38, 39 assigned to it. The construction of winding 49, formed as darkly marked wave winding 54, is described here as example. In a wave winding 54, in each case a winding section 55 (active conductor) actively lying in an assigned slot 39 follows a winding-head connection 56 periodically in succession, so that a wavy winding 54 is obtained. While winding section 55 lies in an assigned slot 39, winding-head connection 56 in each case overstretches one of end areas 57, 58 adjoining the laminated core, up to corresponding slot 39 of next slot group 34. The periodically successive sequence of a winding section 55 and a winding-head connection 56 in wave form allows the formation of wave winding 54. Winding-head connections 56 are disposed radially in layers, so that each of winding-head connections 56 and each of winding sections 55 of a radial position H, I, J, K, L assigned to its associated winding 49 is pulled into core body 4. In this context, radial position H, I, J, K, L of a winding 45, 46, 47, 48, 49 is to be understood as the specific radial position of this winding in the winding head. The particular winding—e.g., winding 49—given a corresponding circuit, then corresponds to a phase which is assigned to this radial position L. Winding-head connections 56 of each of windings 45, 46, 47, 48, 49 form winding heads 27, 28 in both end areas 57, 58 of core body 4.

Figure 3:
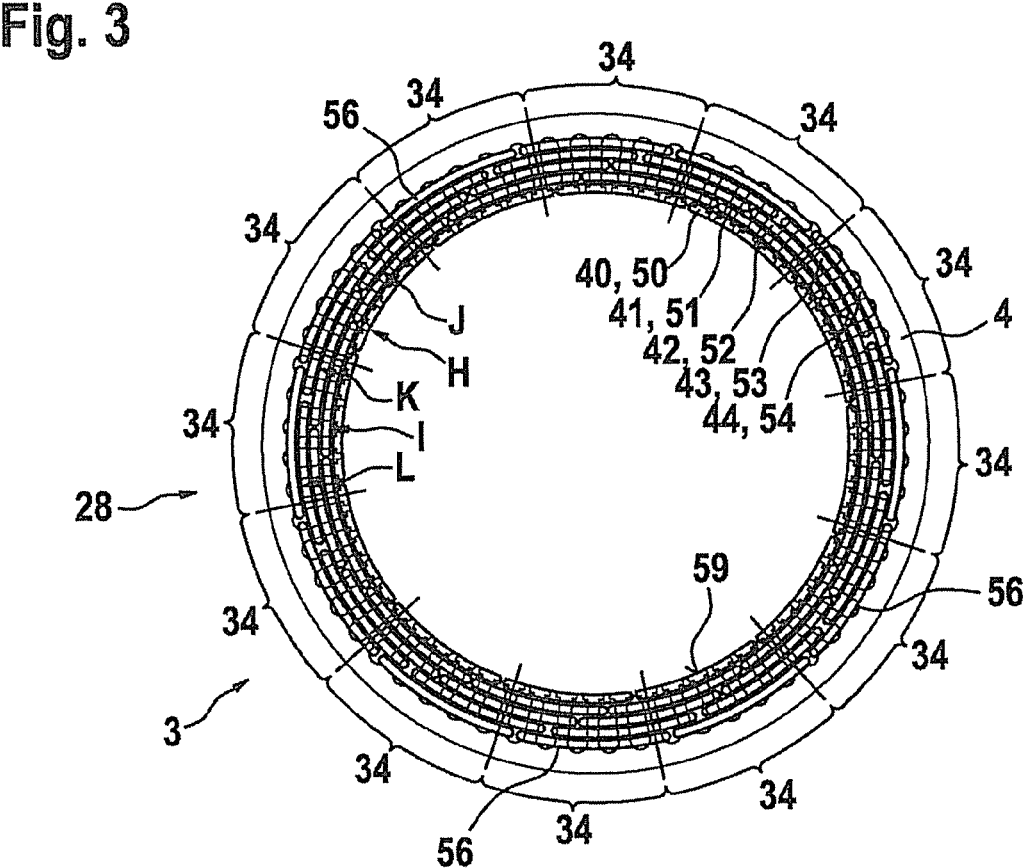
FIG. 3 shows a plan view of the stator from FIG. 2.

FIG. 3 shows a plan view of stator 3 from FIG. 2.

Figure 4:
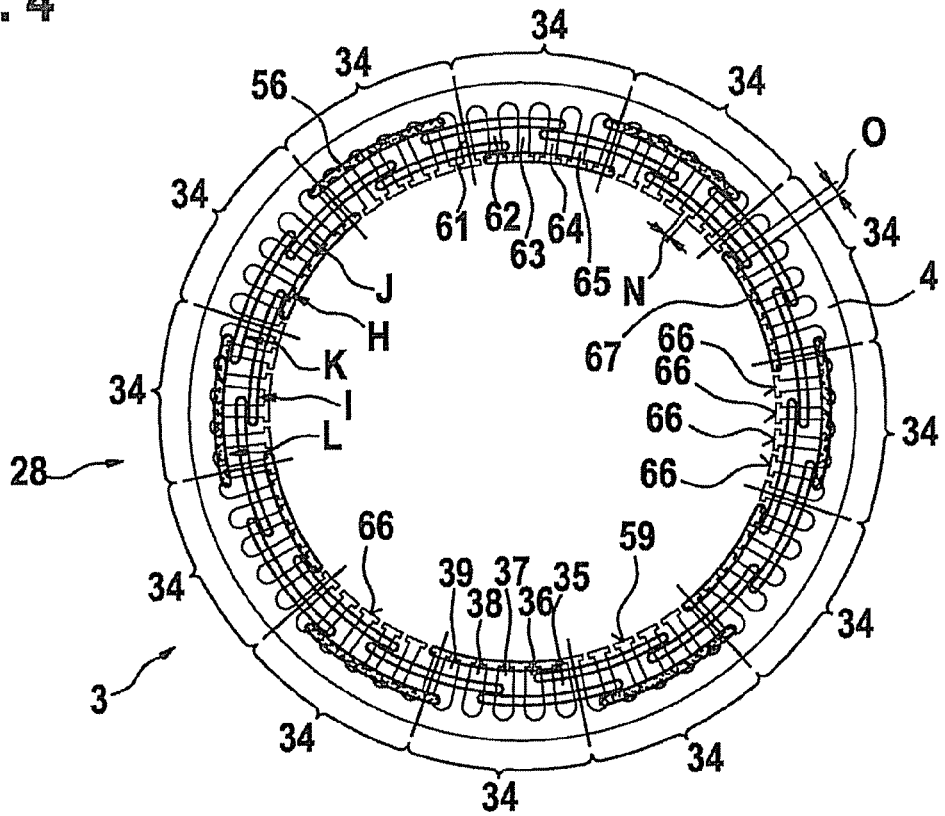
FIG. 4 shows a plan view of a stator having simple wave windings.

FIG. 4 shows a plan view of a stator 3 having simple wave windings. Core body 4 of stator 3 has twelve slot groups 34 having five slots 35, 36, 37, 38, 39 each, which extend from inner side 59 of core body 4 radially into it. Between slots 35, 36, 37, 38, 39, teeth 61, 62, 63, 64, 65 are obtained, having tooth surfaces 66 broadened at radial inner side 59. These broadened tooth surfaces 66 of two adjacent teeth 61, 62, 63, 64, 65 allow a narrowed slot opening 67 to form in each case at inner side 59, whose slot-opening width N is less than maximum slot width O in the circumferential direction of slots 35, 36, 37, 38, 39. The corresponding dimensions are shown in FIG. 4. FIGS. 3 and 4 each show five wave windings 50, 51, 52, 53, 54, which are mounted in core body 4 in five different radial positions H, I, J, K, L of the winding-head connections. In the case of the distributed wave winding shown in FIG. 3, a perceptibly higher filling of slots 35, 36, 37, 38, 39 occurs, so that winding-head connections 56 of distributed windings 40, 41, 42, 43, 44 are disposed radially in layers. To that end, in each case two winding sections 55 of a distributed winding 40, 41, 42, 43, 44 lie on one radial position in an associated slot 35, 36, 37, 38, 39. In the case of stator 3 shown in FIG. 4 having simple wave windings 50, 51, 52, 53, 54, the filling of individual slots 35, 36, 37, 38, 39 is less; fixed slots 35, 36, 37, 38, 39 of slot groups 34 and associated radial positions H, I, J, K, L of the winding-head connections are assigned to each of windings 40, 41, 42, 43, 44 here, as well.

Figure 5:
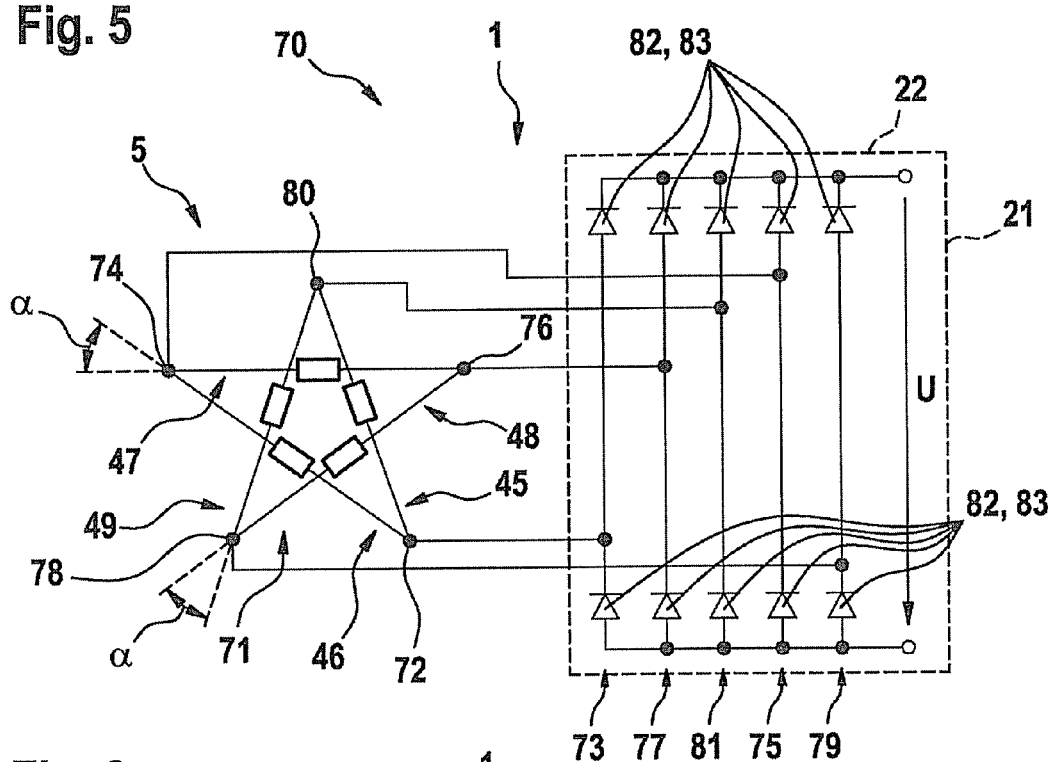
FIG. 5 shows a circuit diagram of a bridge connection of a 5-phase stator in pentagram configuration.

FIG. 5 shows an interconnection 70 corresponding to a pentagram 71 of winding configuration 5. The interconnection may be disposed in bridge rectifier 22 or in the vicinity of a winding head 27, 28. To that end, winding 45 and winding 46 are interconnected at interconnection point 72 to a center tap of first bridge arm 73. Winding 46 is interconnected with winding 47 at interconnection point 74 and fourth bridge arm 75; winding 47 is interconnected with winding 48 at interconnection point 76 with second bridge arm 77. Winding 48 is interconnected with winding 49 at interconnection point 78 with fifth bridge arm 79, and winding 49 is interconnected with winding 45 at interconnection point 80 with third bridge arm 81. Phase angle α between windings 45, 46, 47, 48, 49, interconnected at interconnection points 72, 74, 76, 78, 80, is illustrated by way of example at interconnection points 78 and 74. Phase angle α is approximately or exactly 36°. Bridge arms 73, 75, 77, 79, 81 each have two diodes 83 in the form of rectifier diodes 82.

Figure 6:
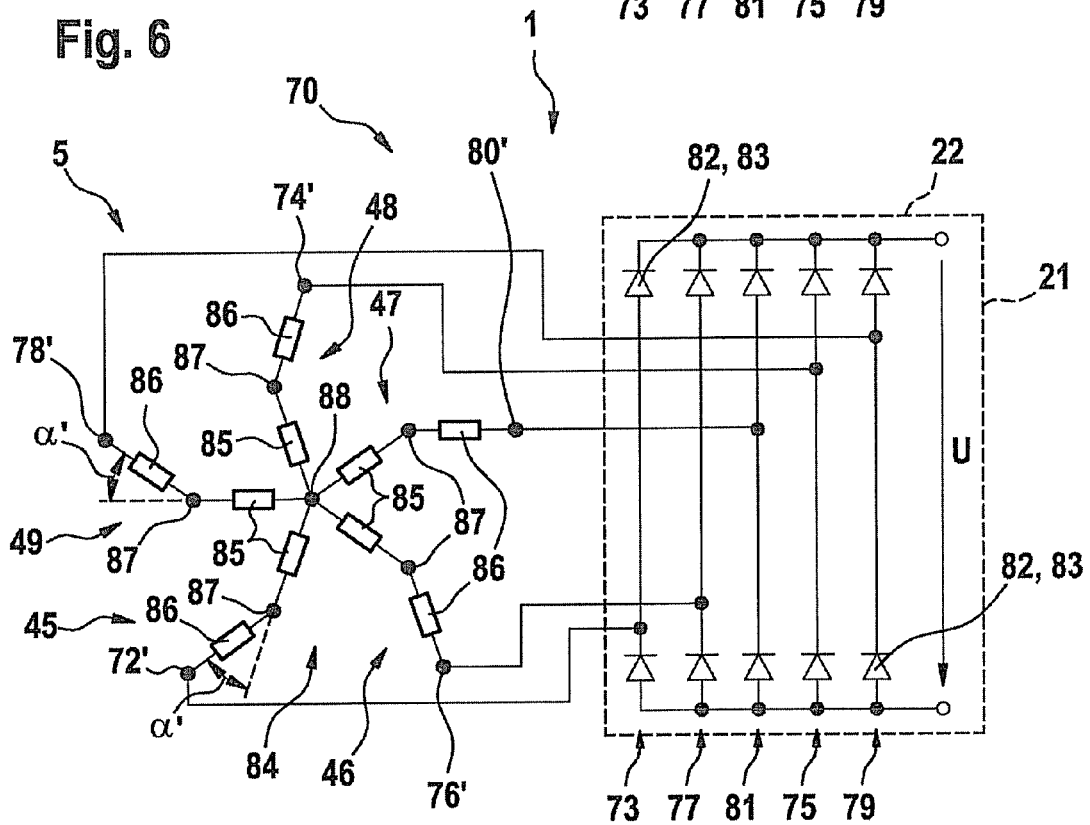
FIG. 6 shows a circuit diagram of an interconnection of a 5-phase stator in a configuration as a short-pitched star.

FIG. 6 shows the interconnection of winding configuration 5 as a short-pitched star. The interconnection may be disposed in bridge rectifier 22 or in the vicinity of a winding head. In each case two parts 85, 86—phase-shifted relative to each other at phase angle α'—of windings 45, 46, 47, 48, 49 are interconnected in series at respective interconnection point 87. To that end, the two parts 85, 86 are introduced into core body 4 offset relative to each other in such a way that, in each instance, they have a phase angle α' of approximately or exactly 36° relative to each other. On one hand, windings 45, 46, 47, 48, 49 are interconnected at a common star point 88, and on the other hand, are interconnected at interconnection points 72', 74' 76' 78', 80' and bridge arms 73, 75, 77, 79, 81 of five-phase bridge rectifier 22.

Figure 7:
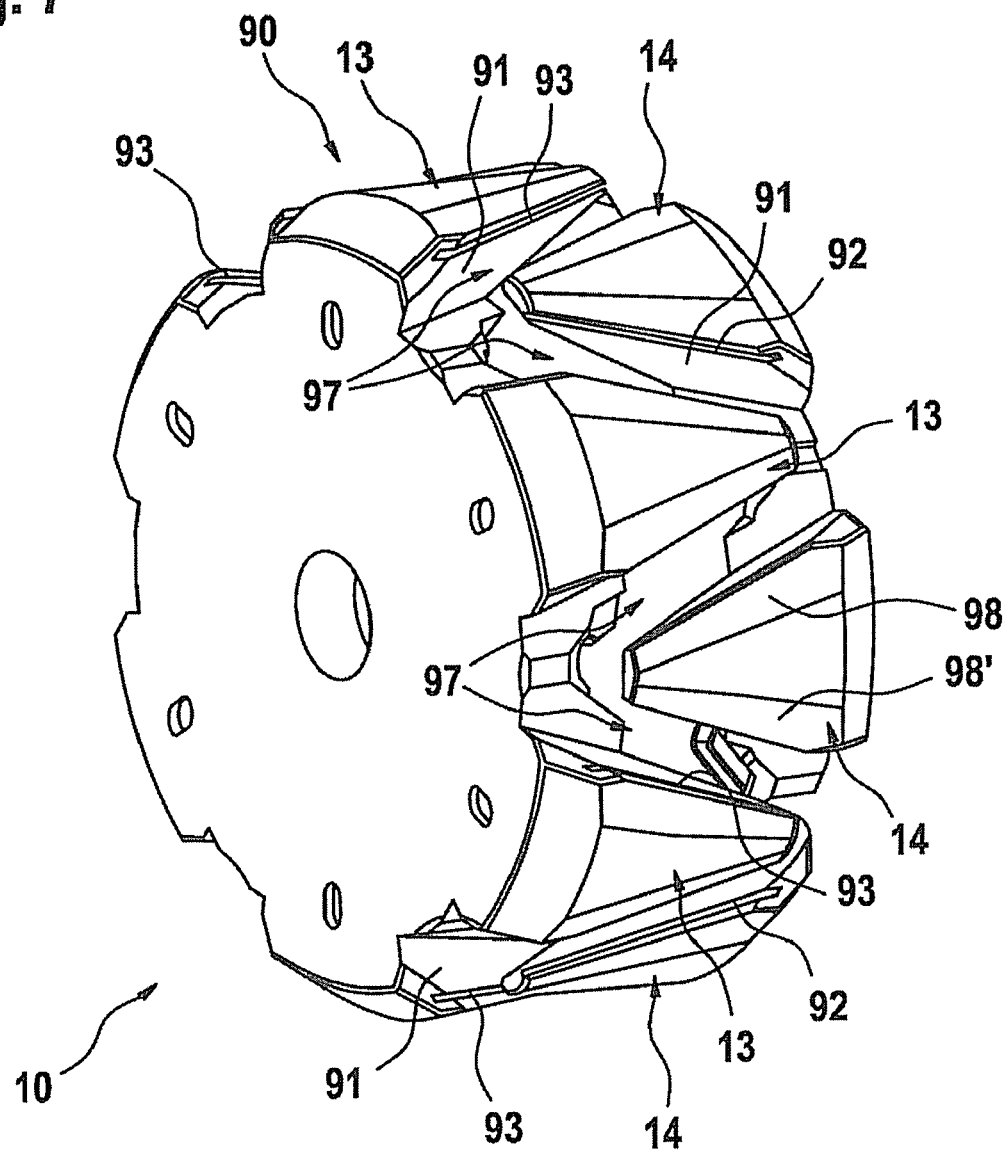
FIG. 7 shows a claw-pole rotor having prepared slits to be fitted with magnets.
Figure 8:
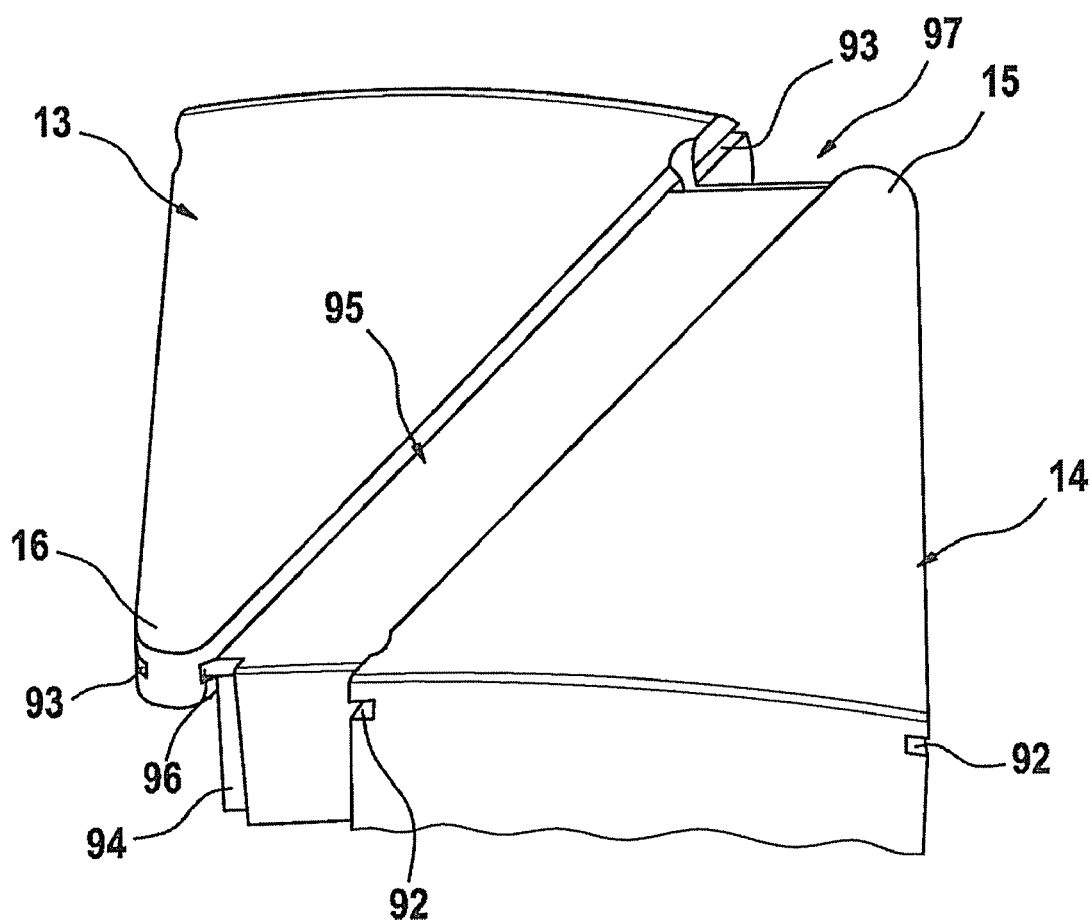
FIG. 8 shows two claw fingers having a permanent magnet.

FIG. 7 and FIG. 8 show a three-dimensional representation of a rotor 10 of electrical machine 2 illustrated in FIG. 1. Lateral surface 90 of rotor 10 is formed by two times six claw fingers 13, 14 (claw-shaped poles) disposed circumferentially in alternation. In each instance between a claw finger 13 and a claw finger 14 is an interspace 97, which is bounded by flanks 91 of claw fingers 13, 14. Located in flanks 91 is, in each case, a pole groove 92, 93, which extends over the complete length of claw finger 13, 14. In each interspace 97, a permanent magnet 94 may be introduced, which is retained between claw fingers 13, 14 by a retaining element 95. To that end, a strip-shaped edge 96 of retaining element 95 grabs on both sides into pole grooves 92, 93. Permanent magnets 94 are used to compensate for the magnetic leakage flux between inversely magnetized claw fingers 13, 14. The power output is increased due to the leakage-flux compensation. To reduce the magnetic noise, claw fingers 13, 14 may be chamfered on their edges that lead and/or trail with respect to the direction of rotation.

A rotor without permanent magnets may also be used, in which case suitable measures for securing the magnets, such as pole grooves 92, 93, may then be omitted.

Figure 9:
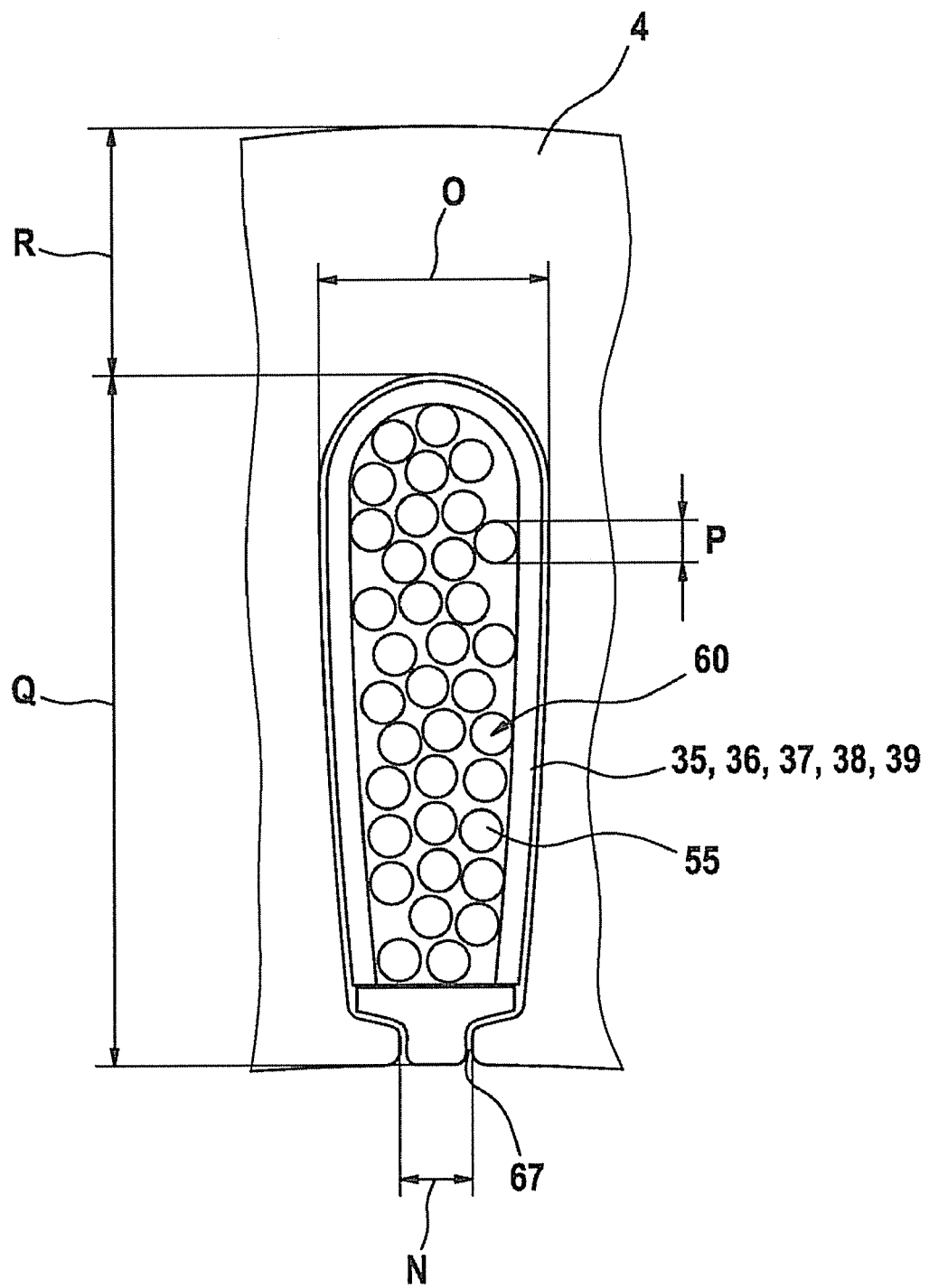
FIG. 9 shows a cross section through an area of a core body having a slot.

FIG. 9 shows a cross-section through an area of core body 4 having a slot 35, 36, 37, 38, 39 in which winding sections 55 made of winding wire 60 are situated. FIG. 9 illustrates the dimension ratios between slot-opening width N, maximum slot width O and slot depth Q of slot 35, 36, 37, 38, 39, yoke height R of core body 4, and winding-wire diameter P of winding wire 60. Yoke height R is the radial distance between the bottom of a slot in core body 4 and the opposite outside diameter of core body 4.

Figure 10:
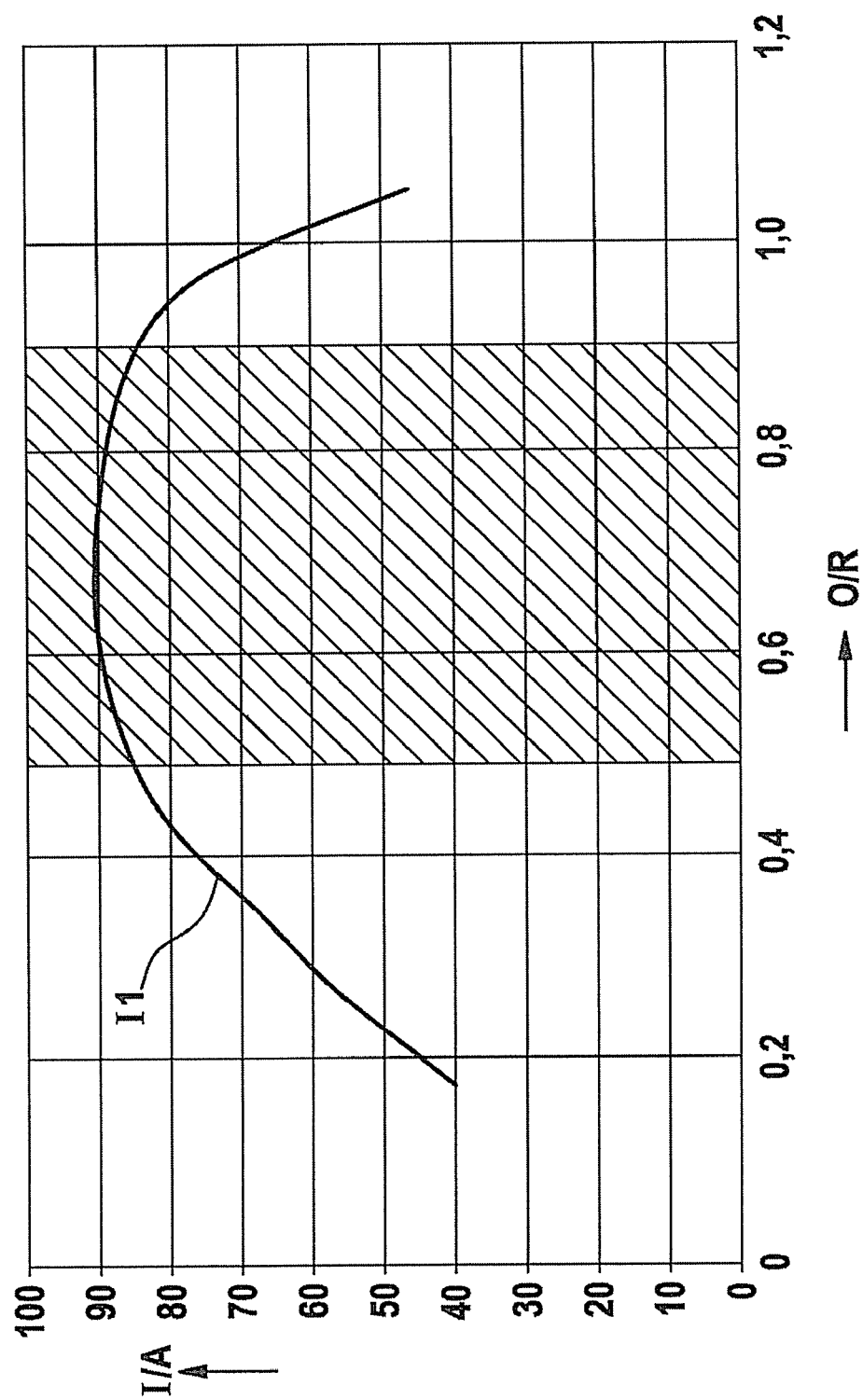
FIG. 10 shows a diagram in which the generator current is plotted over the ratio of the slot width to the yoke height.

FIG. 10 shows a diagram in which the rectified generator current is plotted in amperes over the ratio of maximum slot width O to yoke height R. Generator-current characteristic curve I1 in the area 0.5<O/R<0.9 shows a flat shape on a high level at up to 90 A.

Figure 11:
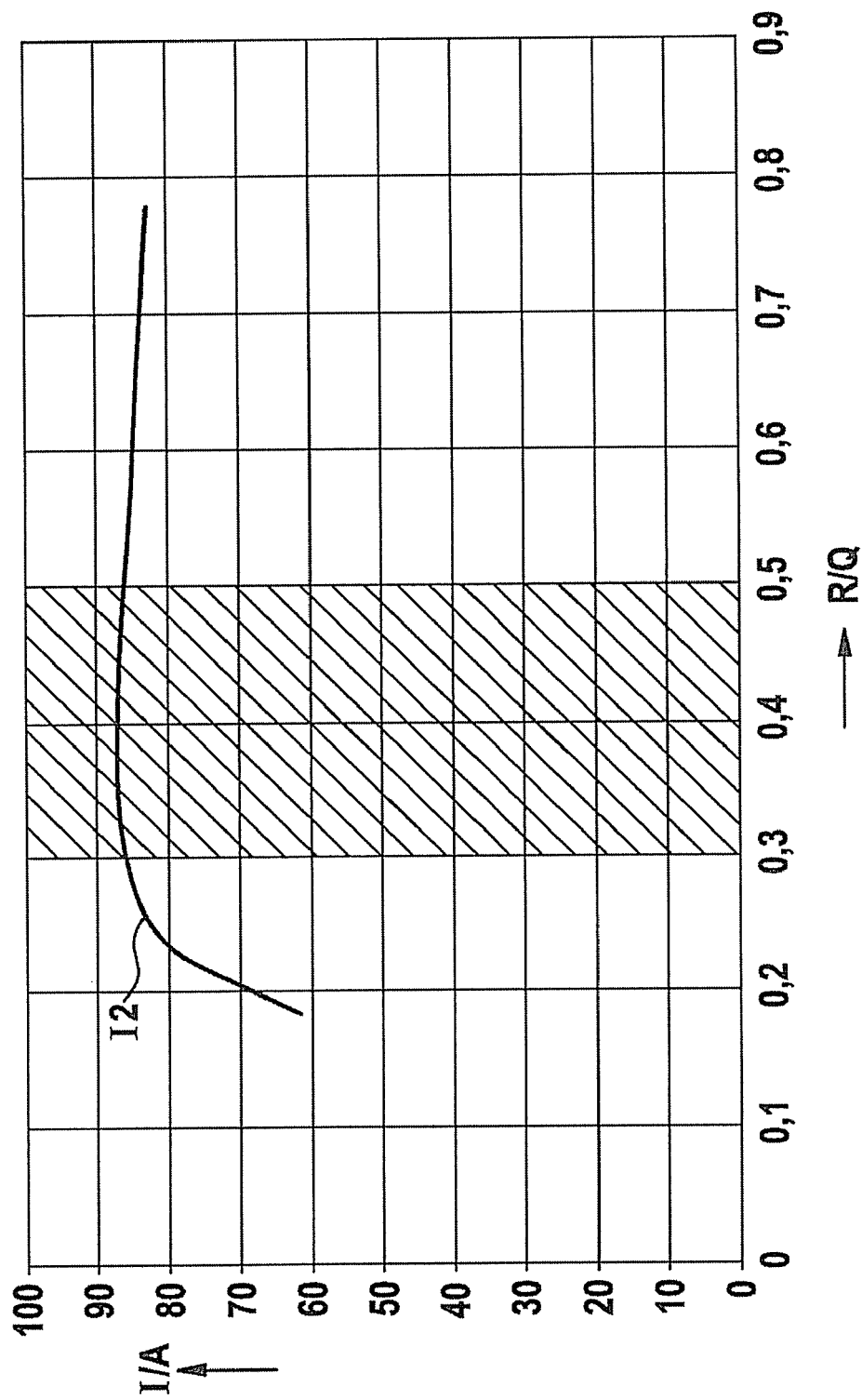
FIG. 11 shows a diagram in which the generator current is plotted over the ratio of the yoke height to the slot depth.

FIG. 11 shows a diagram in which the rectified generator current is plotted in amperes over the ratio of yoke height R to slot depth Q. In this case, in the area 0.3<R/Q<0.5, characteristic curve I2 shows a nearly constant shape at approximately 85 A.

Figure 12:
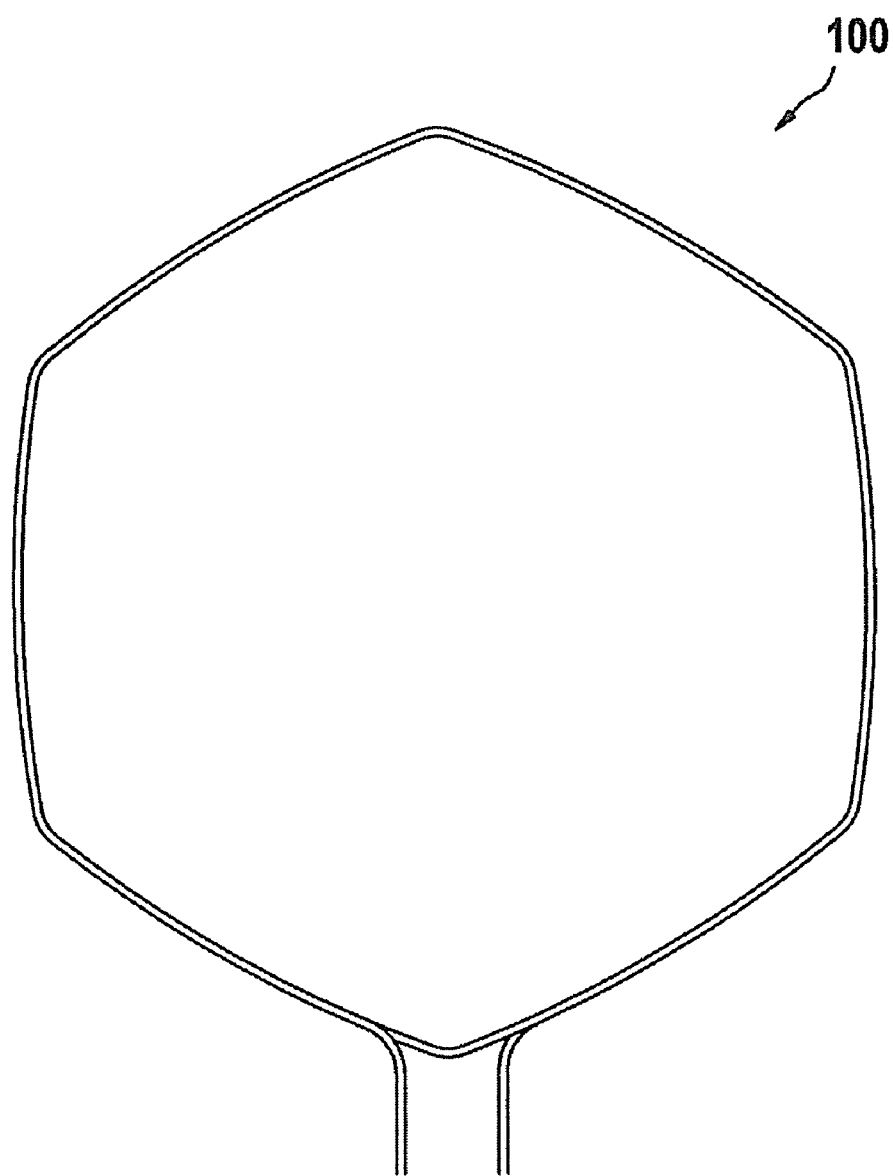
FIG. 12 shows a ring-shaped winding unit.
Figure 13:
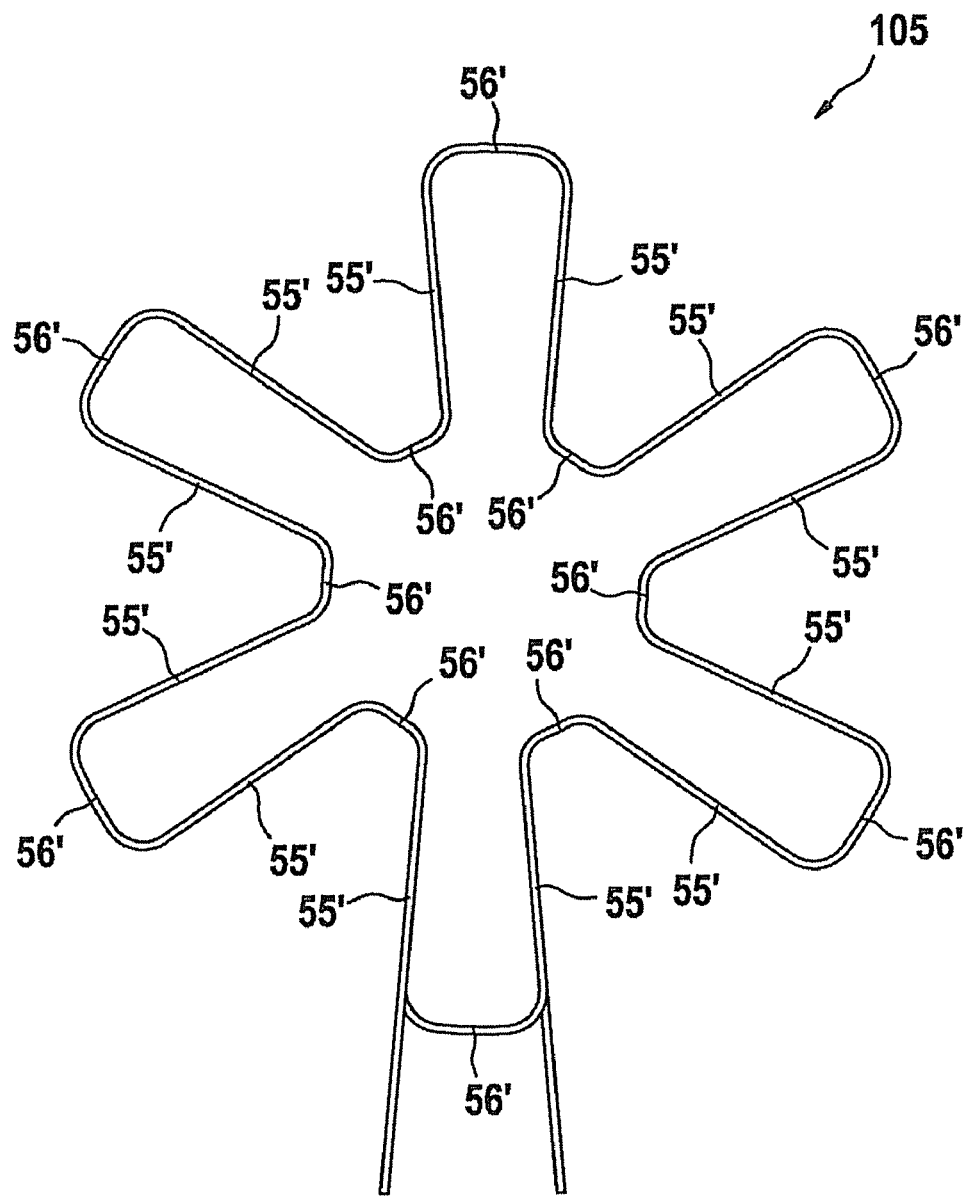
FIG. 13 shows a star-shaped winding unit.

FIG. 12 shows a roughly ring-shaped and predominantly flat winding unit 100 as preliminary stage for preparing star-shaped winding unit 105 shown in FIG. 13. Star-shaped winding unit 105 has straight winding sections 55' which, in this production stage, run in the radial direction, and later lie in the slots in the axial direction. Situated between straight winding sections 55' are winding parts 56' which in each case run in the circumferential direction, and later form winding-head connections 56.

Figure 14:
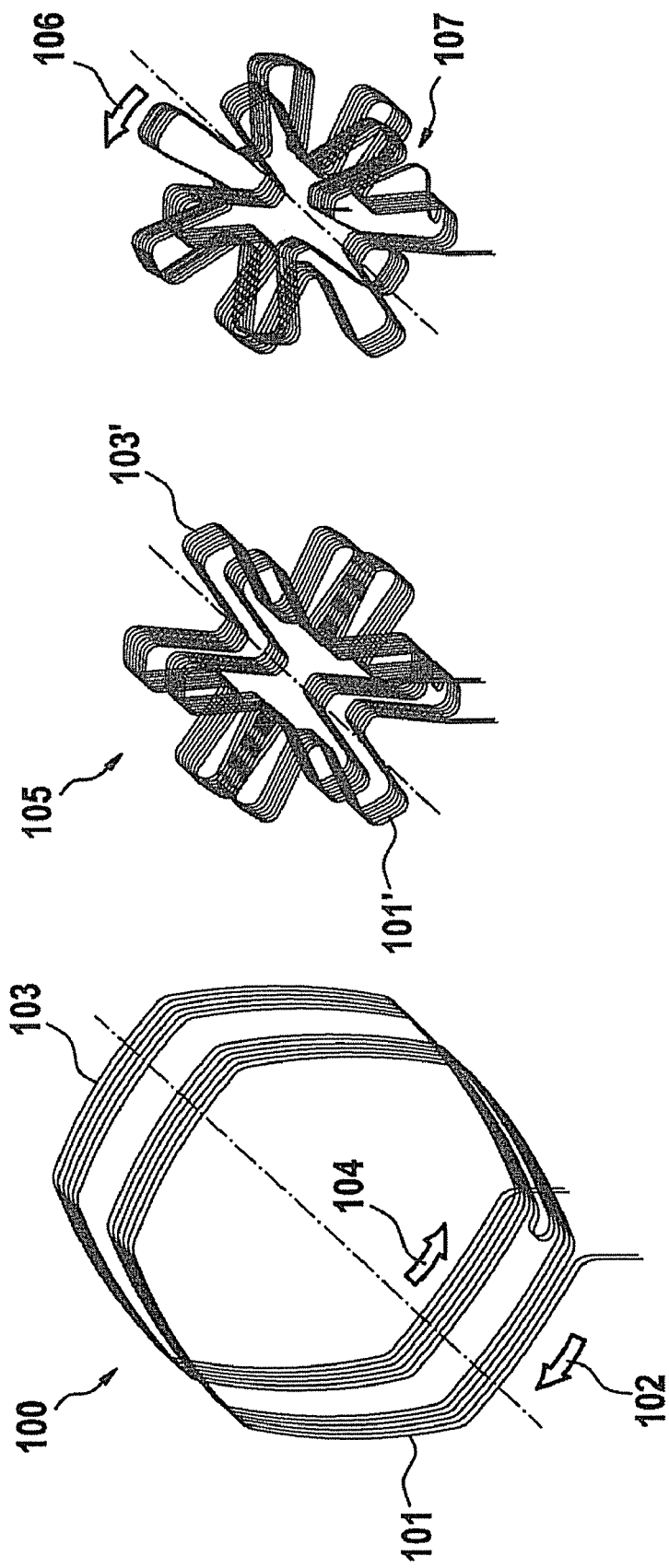
FIG. 14 shows steps for manufacturing a distributed winding from an initially ring-shaped winding unit.

FIG. 14 shows the production of a distributed wave winding from ring-shaped winding units 100 in three steps (FIGS. 14a-14c). In a preliminary stage (FIG. 14a), ring-shaped winding units 100 are prepared, whose first half 101 is wound in a first direction (arrow 102) and whose second half 103 is wound in the opposite direction (arrow 104). From this preliminary stage, star-shaped winding units 105 are created (see also FIG. 14b). Star-shaped winding units 105 are split into two halves 101', 103', which are formed from halves 101, 103 of ring-shaped winding units 100. Halves 101', 103' are subsequently twisted relative to each other by one pole pitch in the circumferential direction (arrow 106), in doing which, a winding unit is obtained for a distributed winding 107 (see also FIG. 14c).

Figure 15:
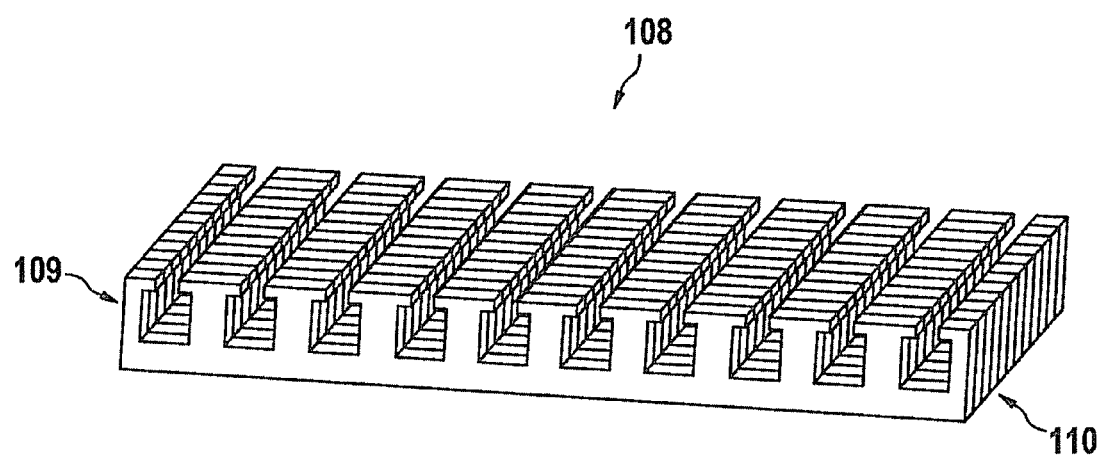
FIG. 15 shows a cuboidal, plane stator core (in principle).
Figure 16:
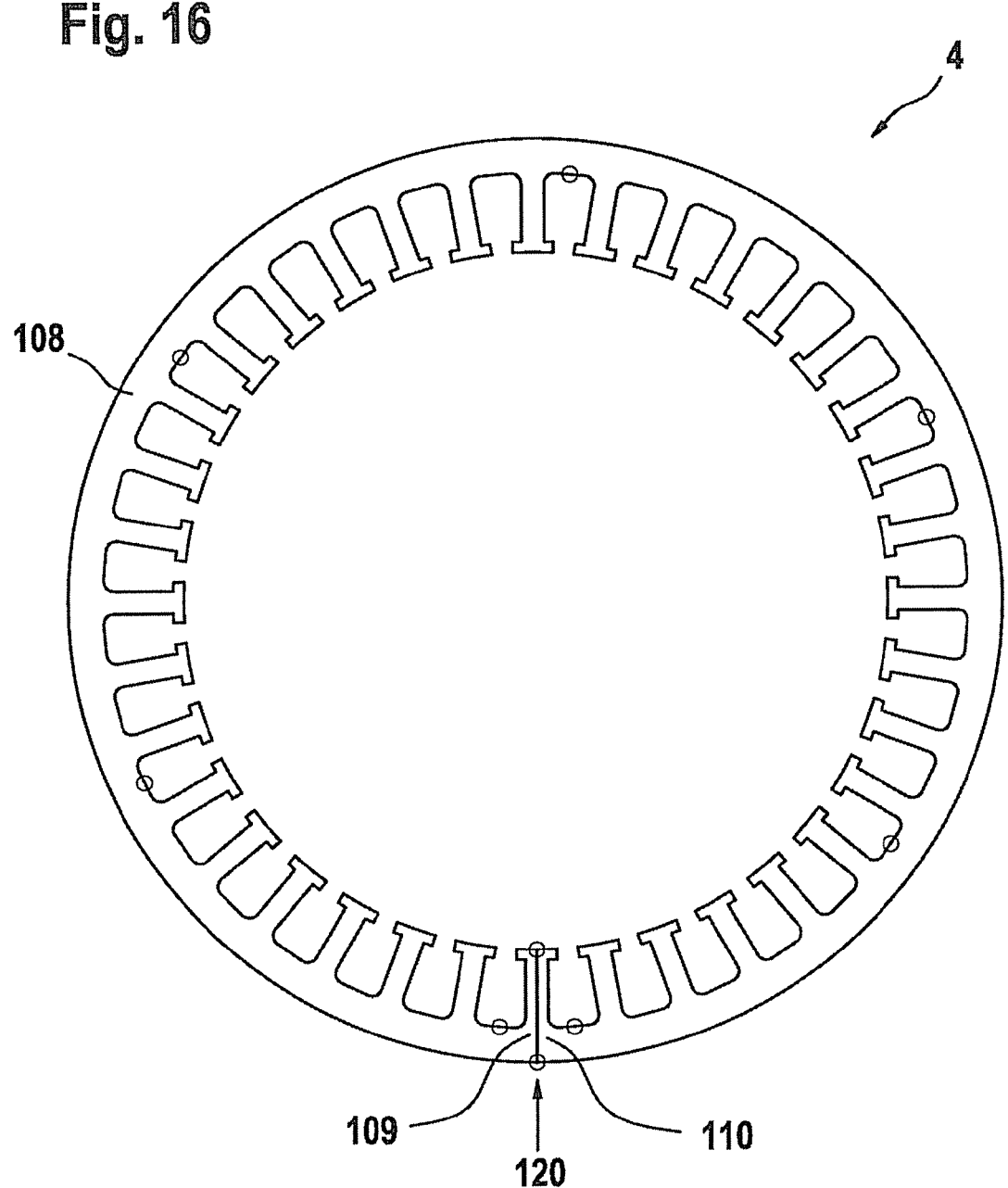
FIG. 16 shows a cylindrical core body made from a round-bent, formerly plane stator core (in principle).

FIG. 15 shows an example of a plane laminated stator core 108 having two laminated-stator-core ends 109, 110. By bending laminated stator core 108 round and subsequently joining the two laminated-stator-core ends 109, 110, core body 4 shown in FIG. 16 is obtained, having a joint 120. In the method of the present invention, prior to the bending-round operation, windings 45, 46, 47, 48, 49 are introduced into laminated stator core 108; they are not depicted in FIG. 16.

All three views in FIG. 17 show winding-head connections 56 of one phase. Arrow 111 points in the axial direction, arrow 112 points in the circumferential direction and arrow 113 points in the radial direction.

Figures 17A, 17B, 17C:
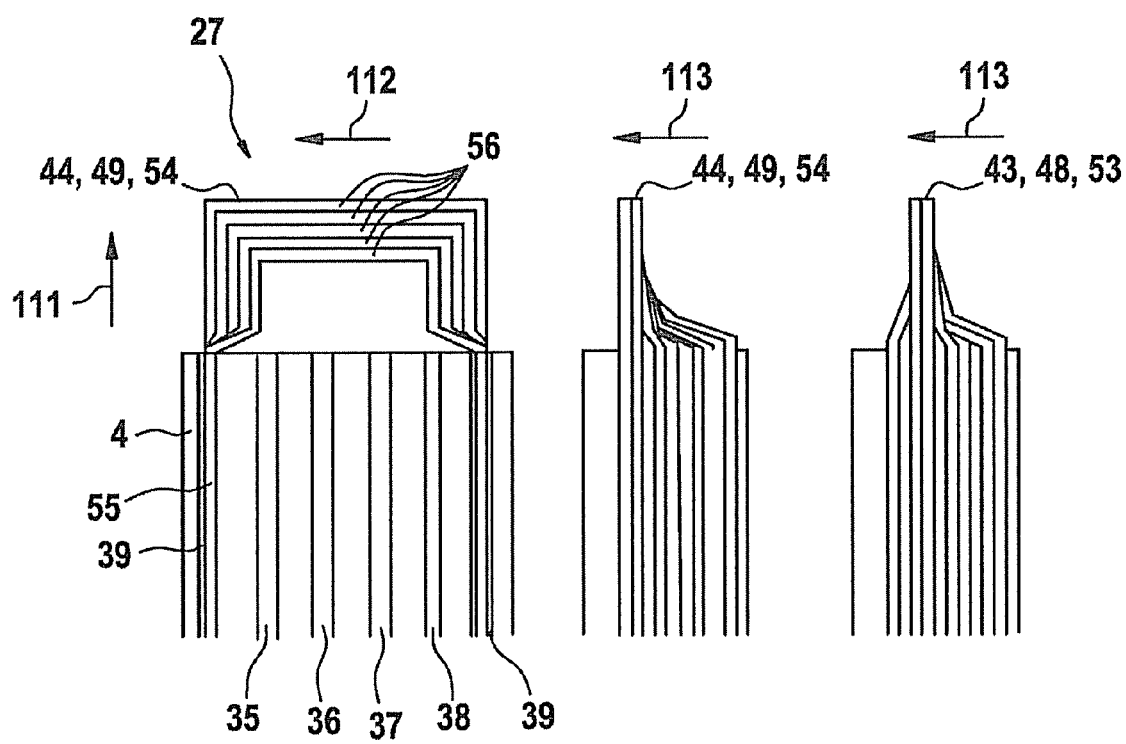
FIG. 17 shows a winding head having winding-head connections disposed in layers.

FIG. 17a shows the winding sections of a winding, implemented according to the present invention, in the slot and in the winding head for one pole pitch. The transition of the winding sections to the winding-head connections of a winding is shown in plan view from the bore. The view in FIG. 17b shows, in a longitudinal section, the transition of the winding sections in the slot to the winding-head connections in the winding-head area, which are located in the radially outermost position.

The view in FIG. 17c shows, in a longitudinal section, the transition of the winding sections in the slot to the winding-head connections in the winding-head area, which are located in the radially second outermost position.

Figure 18:
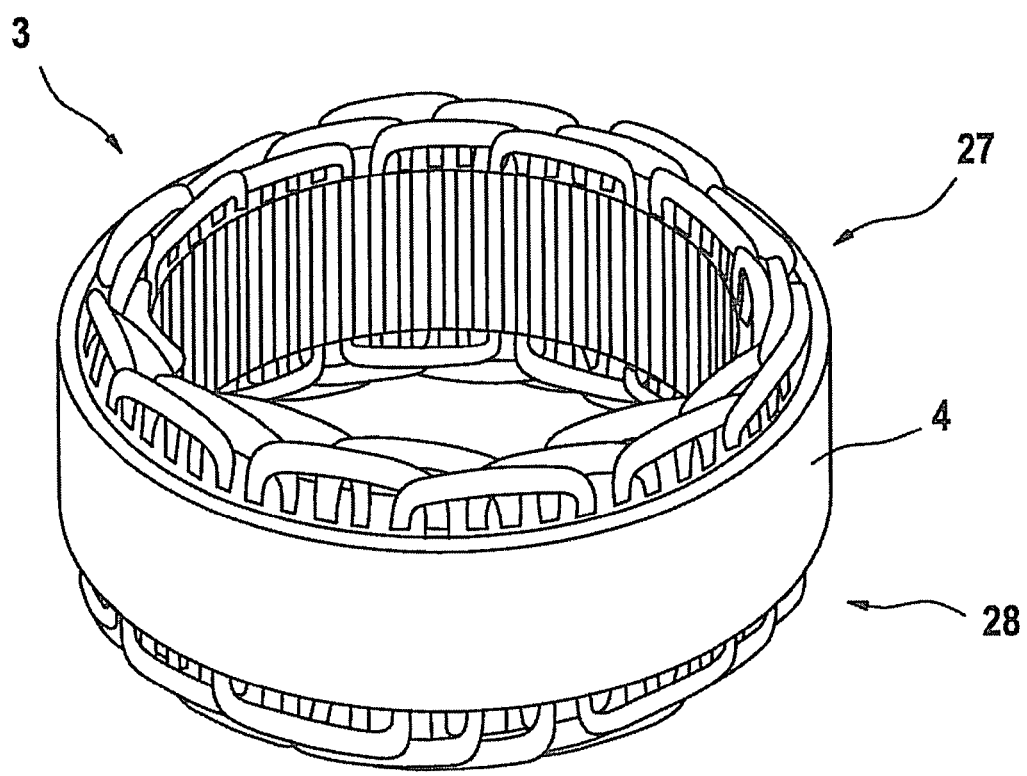
FIGS. 18 to 26 show various representations (in principle) of exemplary embodiments of the windings in the core body.

FIGS. 18 through 26 show various specific embodiments and winding schemes according to the present invention. FIG. 18 shows a stator having a simple wave winding, the winding-head connections of one phase being marked.

Figure 19:
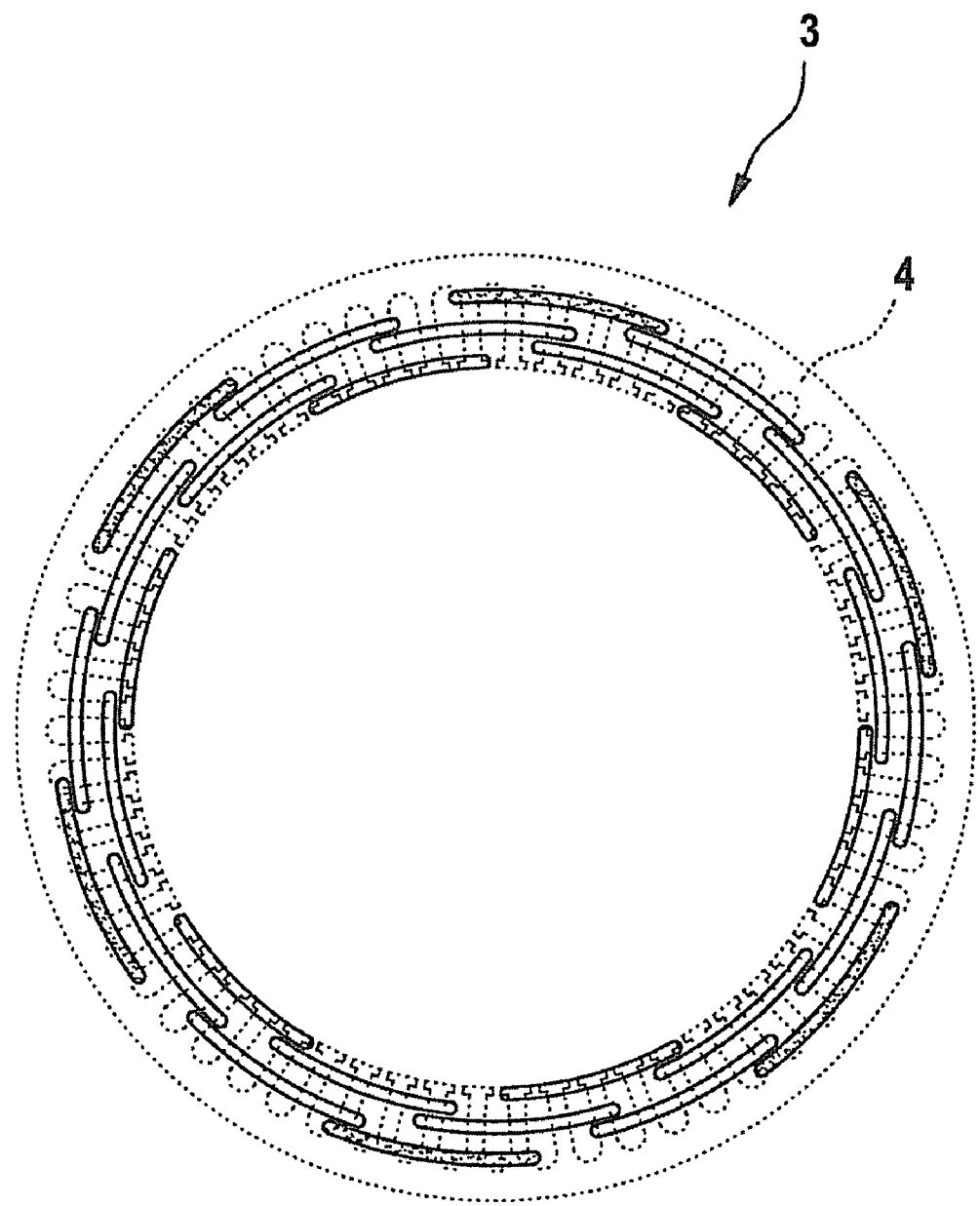

FIG. 19 shows a plan view of a winding head of a simple wave winding, the winding-head connections of one phase being marked.

Figure 20:
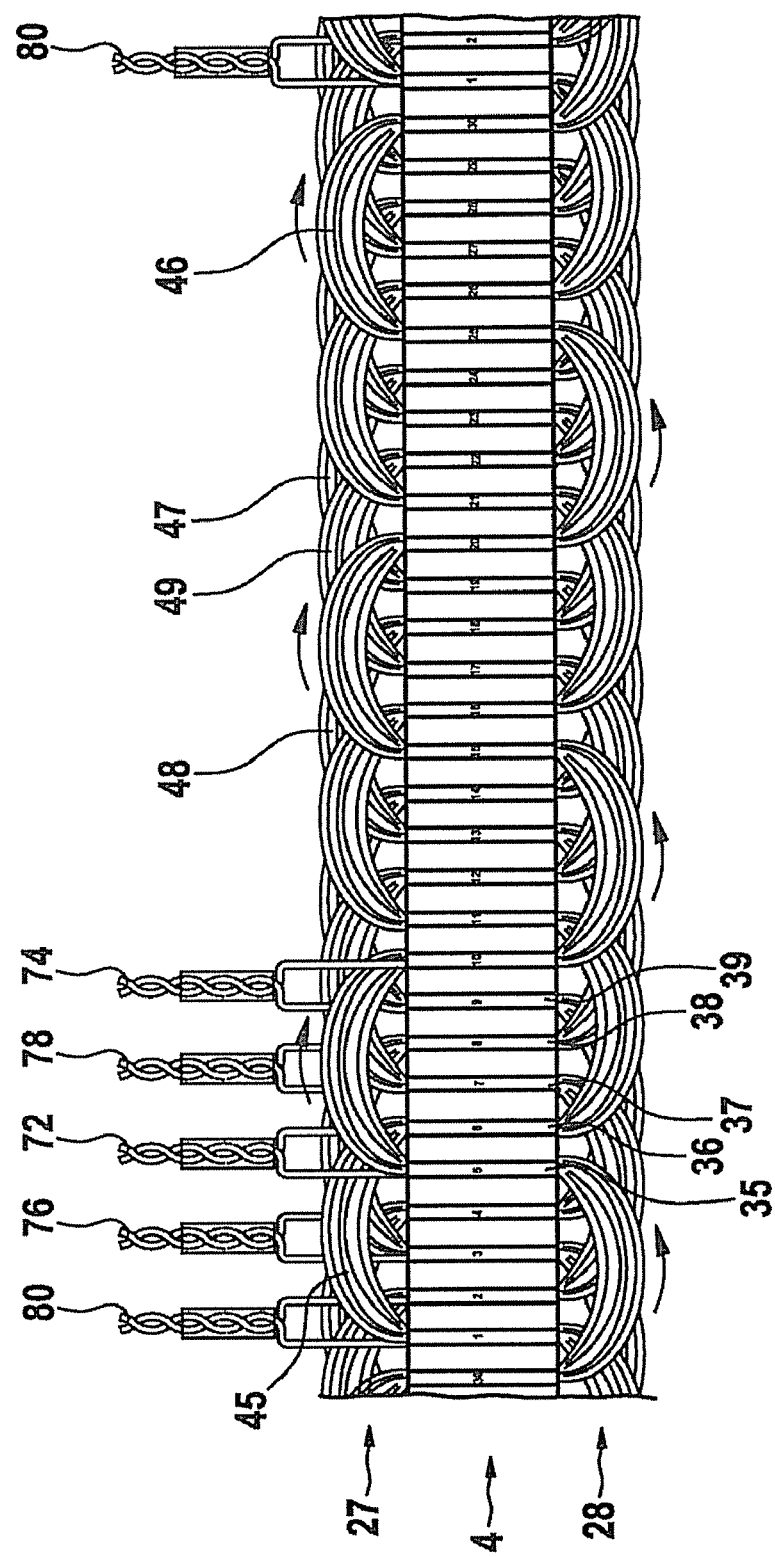

FIG. 20 shows a plan view from the bore onto a stator unwound in one plane, having six poles and thirty slots 35, 36, 37, 38, 39, each phase being made up of one simple wave winding 50, 51, 52, 53, 54, having corresponding connections 72, 74, 76, 78, 80, for example, for the interconnection in pentagram configuration in a rectifier according to FIG. 5.

Figure 21:
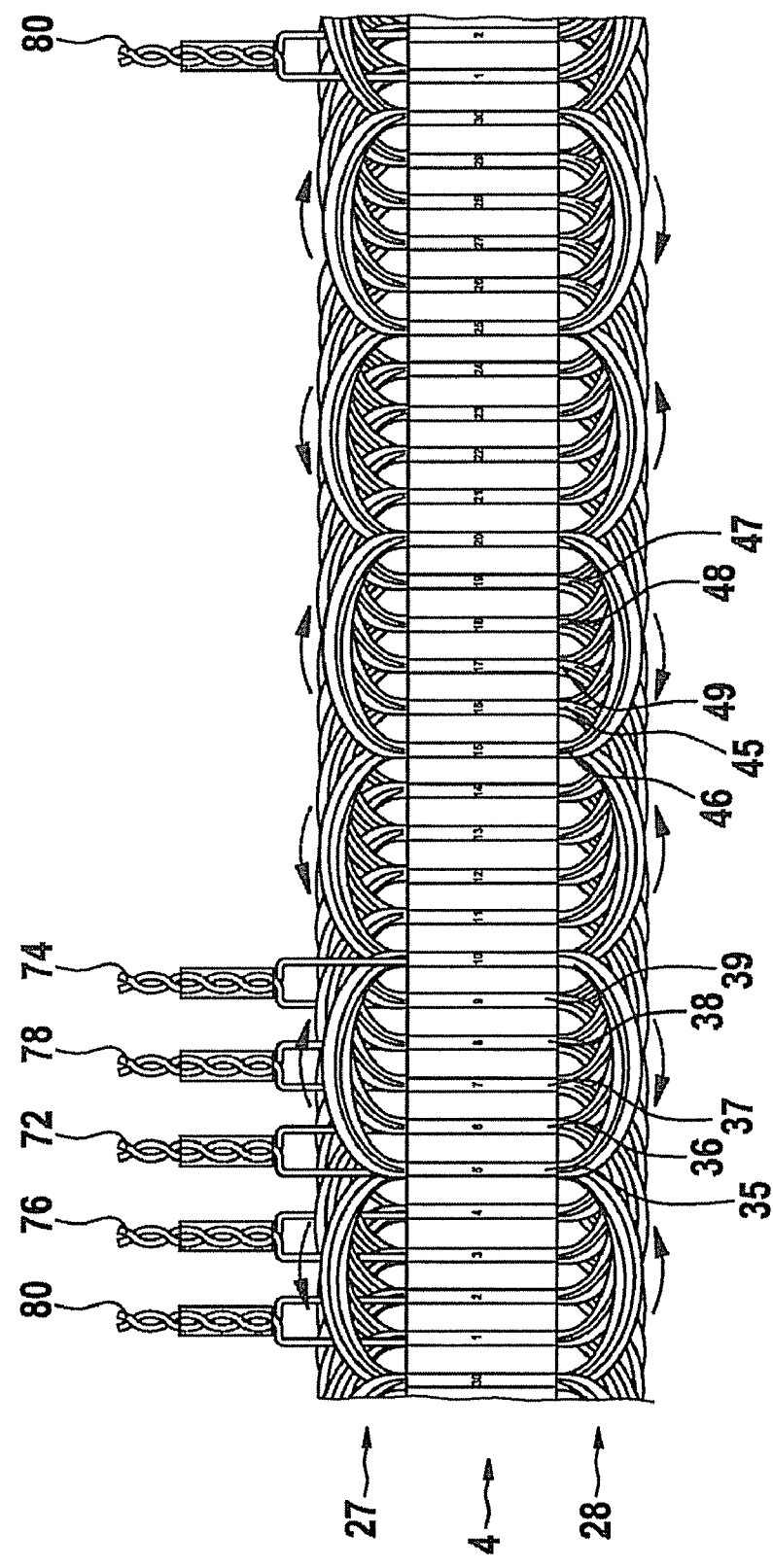

FIG. 21 shows a plan view from the bore onto a stator unwound in one plane, including six poles and thirty slots 35, 36, 37, 38, 39 having a distributed wave winding, with corresponding connections 72, 74, 76, 78, 80, for example, for the interconnection in pentagram configuration in a rectifier according to FIG. 5.

Figure 22:
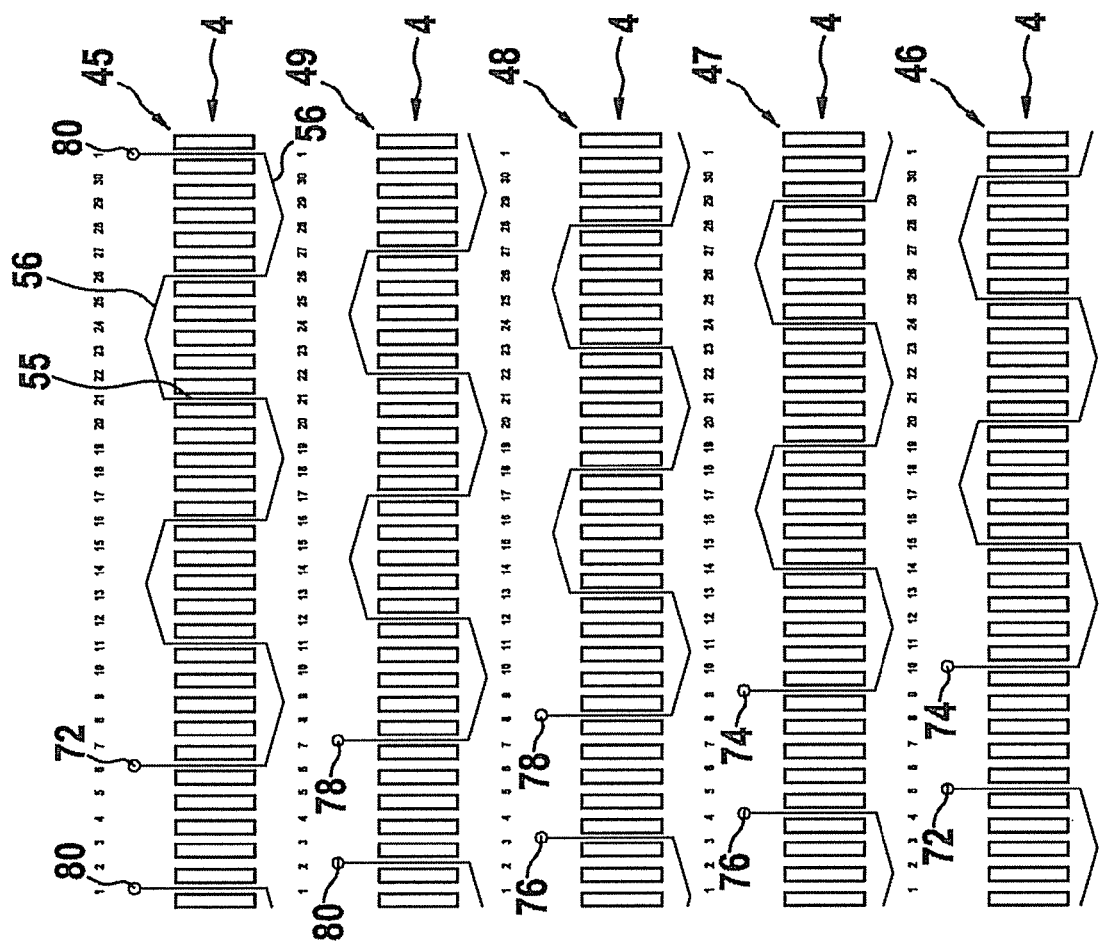

FIG. 22 shows a winding scheme for a stator including six poles and thirty slots 35, 36, 37, 38, 39, having a simple wave winding, with corresponding connections 72, 74, 76, 78, 80, for example, for the interconnection in pentagram configuration in a rectifier according to FIG. 5.

Figure 23:
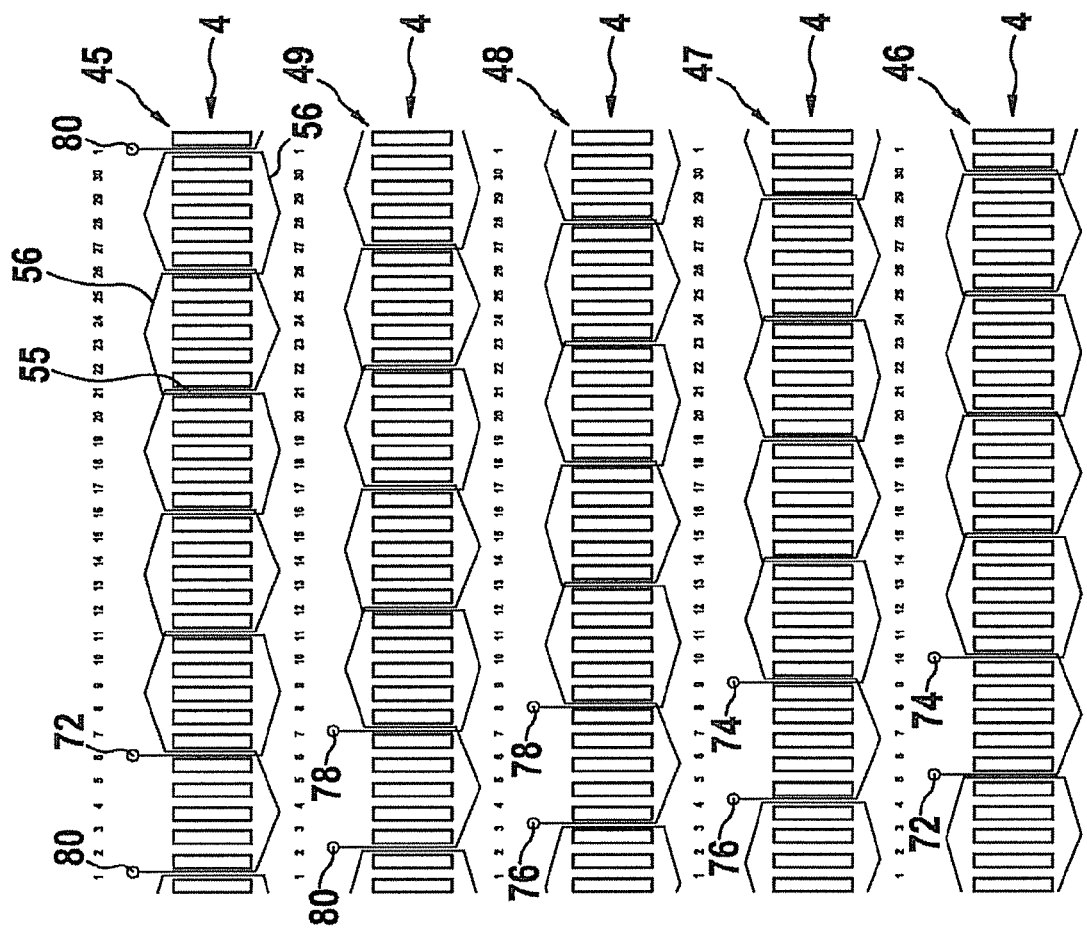

FIG. 23 shows a winding scheme for a stator including six poles and thirty slots 35, 36, 37, 38, 39, having a distributed wave winding, with corresponding connections 72, 74, 76, 78, 80, for example, for the interconnection in pentagram configuration in a rectifier according to FIG. 5.

Figure 24:
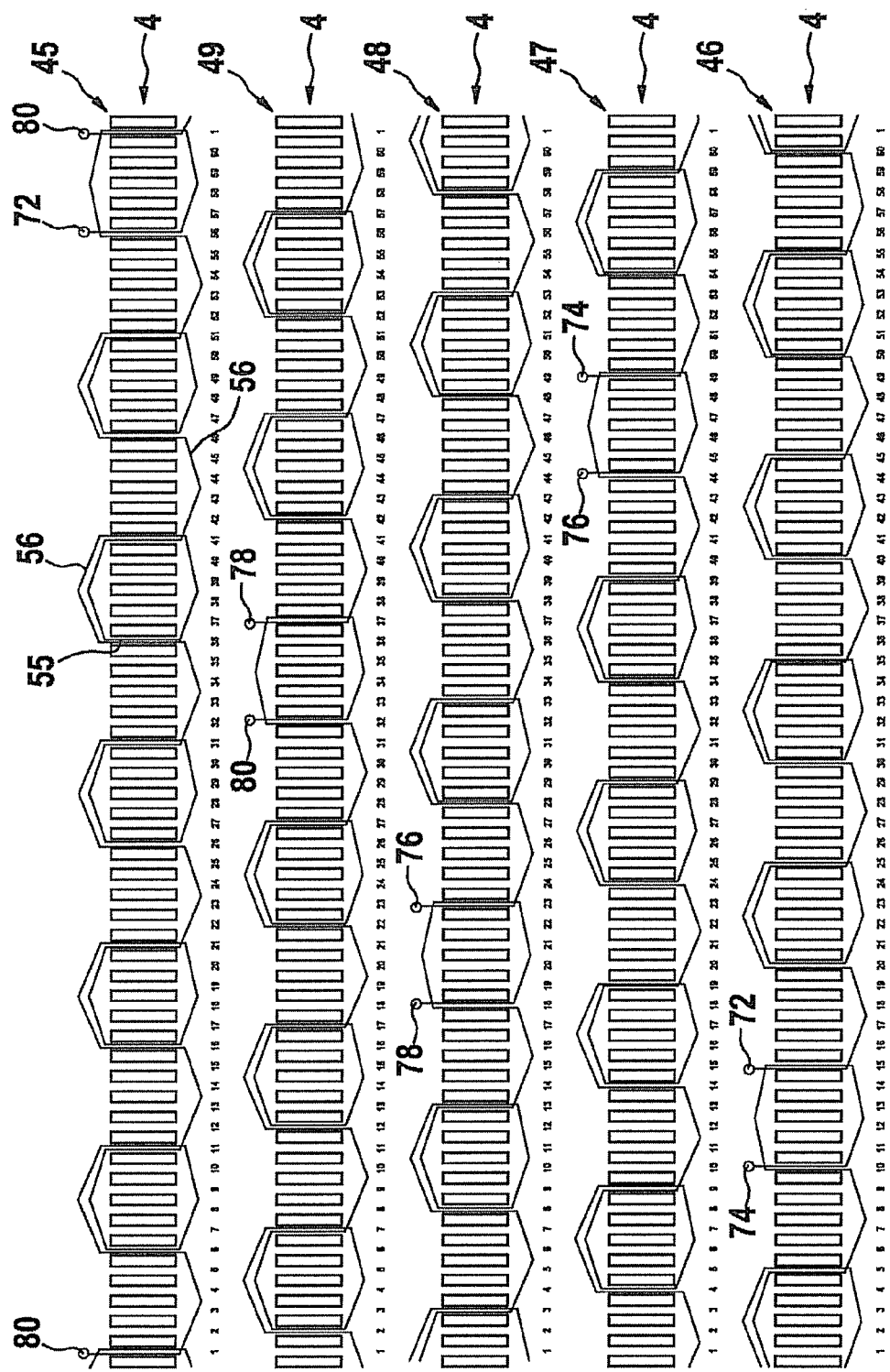

FIG. 24 shows a winding scheme for a simple lap winding for a stator including twelve poles and sixty slots 35, 36, 37, 38, 39, having corresponding connections 72, 74, 76, 78, 80, for example, for the interconnection in pentagram configuration in a rectifier according to FIG. 5.

Figure 25:
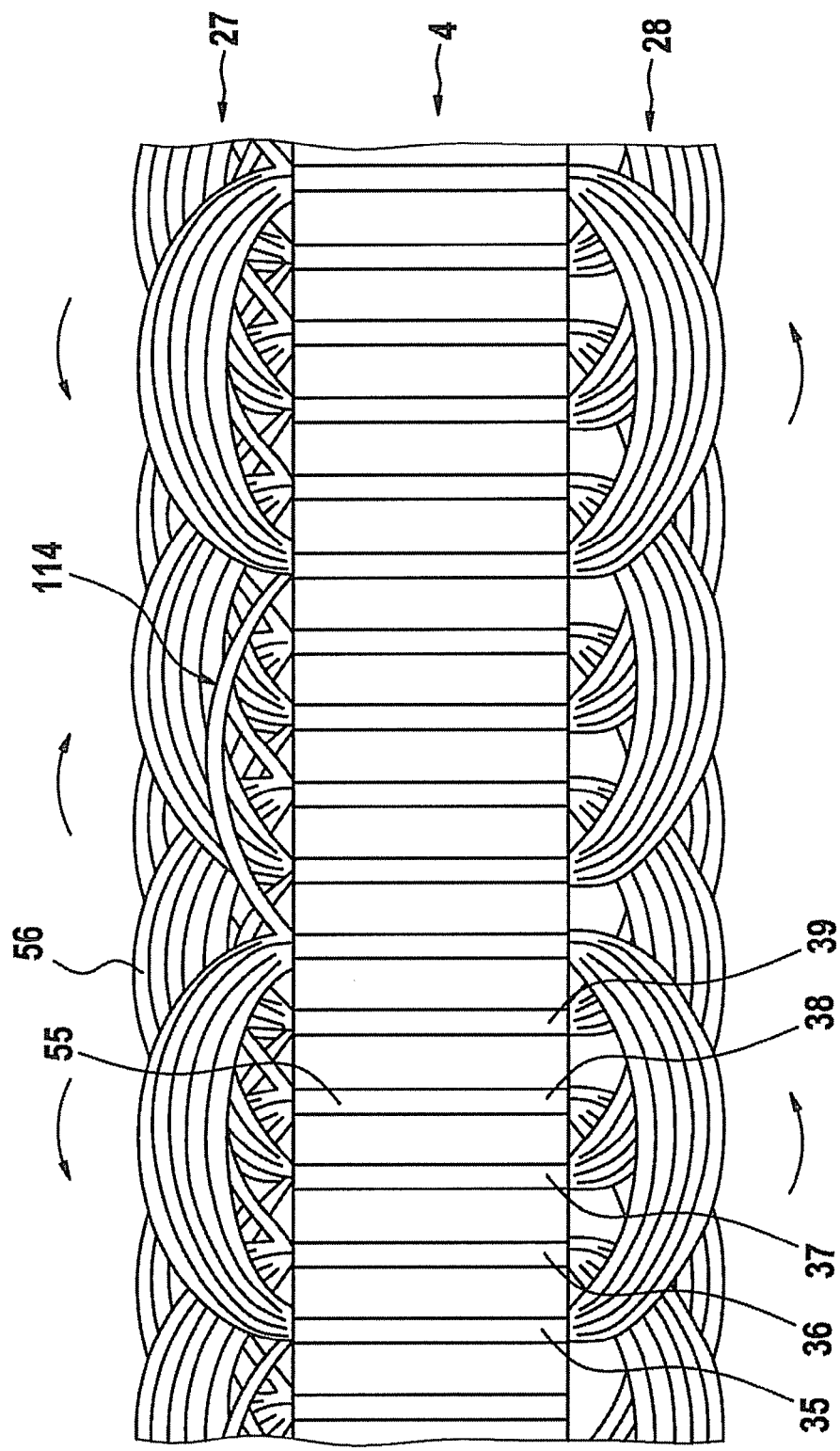

FIG. 25 shows a plan view from the bore onto a part of a stator unwound in one plane having a simple lap winding, the radially innermost phase being marked. In each case a loop connector 114 is disposed between winding-head connections 56.

Figure 26:
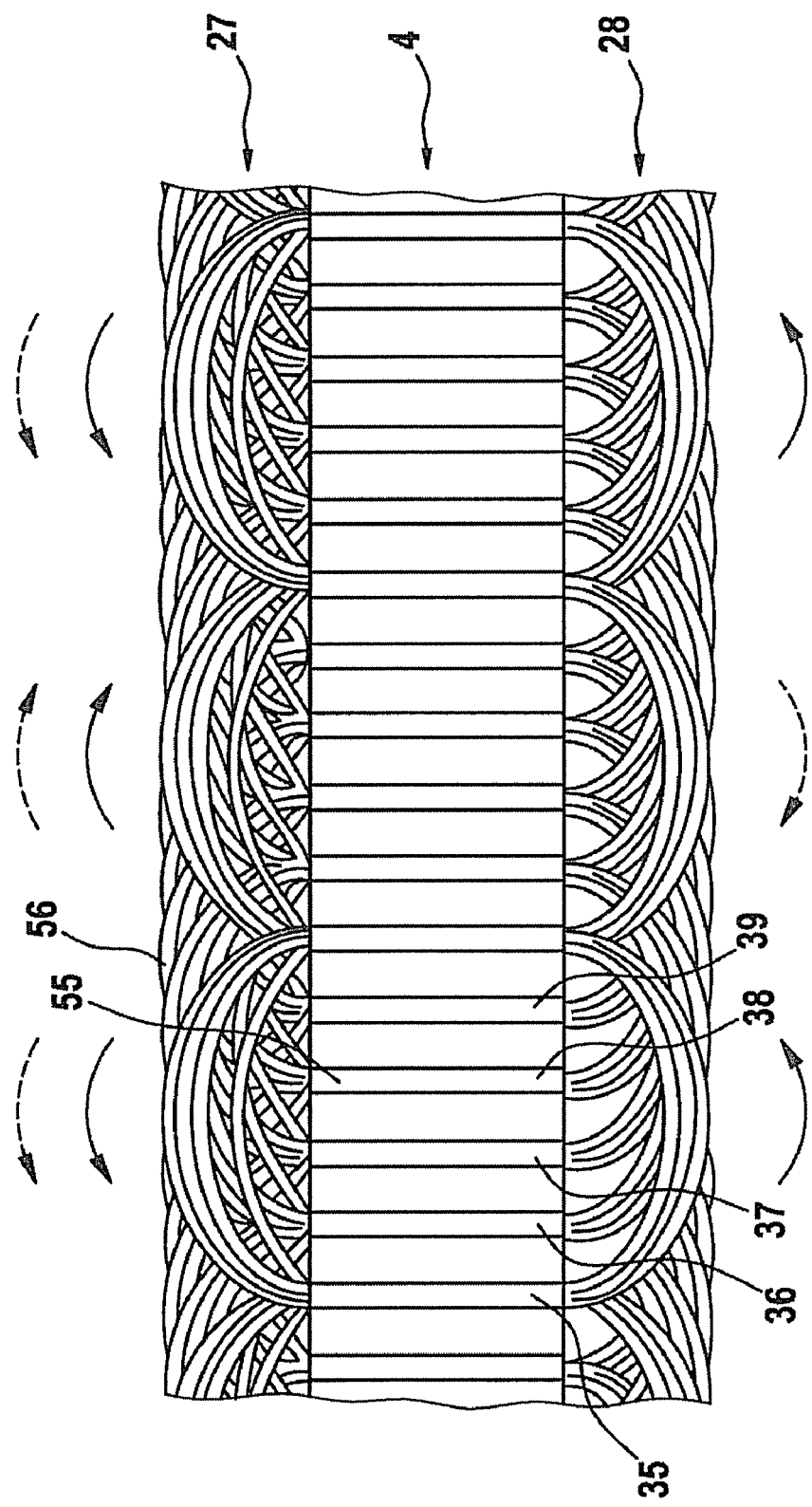

Finally, FIG. 26 shows a plan view from the bore onto a part of a stator unwound in one plane having a distributed lap winding, the radially innermost phase being marked.

What is claimed is:

1. A polyphase electrical machine, comprising:
    a stator including a core body having a circumferential slot pitch; and
    a winding configuration having a plurality of windings forming phases, each winding and each slot of a group of slots that extends over one pole pitch being assigned to one of the phases, the windings having winding sections that lie in assigned slots and between which, in each case, a winding-head connection is formed, the winding-head connections of different windings being disposed radially in layers relative to each other,
    wherein the number of phases is five.

2. The polyphase electrical machine according to claim 1, wherein the respective winding-head connections of a winding are disposed in an approximately uniform radial position.

3. The polyphase electrical machine according to claim 1, wherein a number of slots corresponds to a multiple of the number of phases.

4. The polyphase electrical machine according to claim 2, wherein a number of radial positions corresponds to one of the number of phases and a multiple of the number of phases.

5. The polyphase electrical machine according to claim 1, wherein the windings are one of simple windings and distributed windings.

6. The polyphase electrical machine according to claim 1, wherein the windings take the form of one of lap windings and wave windings.

7. The polyphase electrical machine according to claim 1, wherein each of the slots has a maximum slot width which is greater than two times a diameter of a winding wire from which the windings are wound.

8. The polyphase electrical machine according to claim 7, wherein each of the slots, at its radially inner end, includes a slot opening whose slot-opening width is less than two times the diameter of the winding wire.

9. The polyphase electrical machine according to claim 7, wherein the maximum slot width is less than a yoke height of the core body formed as a laminated stator core.

10. The polyphase electrical machine according to claim 9, wherein a ratio of the maximum slot width to the yoke height of the laminated stator core lies in the range between 0.5 and 0.9.

11. The polyphase electrical machine according to claim 9, wherein each of the slots has a slot depth, a ratio of the yoke height to the slot depth lying in the range between 0.3 and 0.5.

12. The polyphase electrical machine according to claim 1, further comprising:
    a rotor having a number of poles which, multiplied by the number of phases, yields a number of slots.

13. The polyphase electrical machine according to claim 12, wherein the rotor includes a magnetically active part having an outside diameter and having an axial length, the outside diameter being greater than the axial length of the magnetically active part.

14. The polyphase electrical machine according to claim 12, wherein the rotor is constructed in a claw-pole type of construction having two magnet-wheel halves, and includes a core situated axially between the magnet-wheel halves, essentially trapezoidal claws having pole surfaces which face a stator bore.

15. The polyphase electrical machine according to claim 14, further comprising:
    permanent magnets configured to compensate for leakage flux disposed between claw fingers.

16. The polyphase electrical machine according to claim 15, wherein the core body has an axial core-body length and the permanent magnets have an essentially uniform axial magnet length, the axial magnet length being between 0.6-fold and 1.2-fold the axial core-body length.

17. The polyphase electrical machine according to claim 1, further comprising:
    a rectifier configured to connect to the windings by a bridge connection.

18. The polyphase electrical machine according to claim 17, wherein the bridge connection includes ten diode elements.

19. The polyphase electrical machine according to claim 1, wherein the windings are interconnected in a pentagram configuration.

20. The polyphase electrical machine according to claim 1, wherein the windings are interconnected in a short-pitched star configuration, each of the windings being made up of two winding parts that are short-pitched relative to each other.

21. The polyphase electrical machine according to claim 16, wherein each two inversely magnetized claw fingers situated opposite each other on a peripheral side have an axial spacing of claw fingertips, the axial spacing of the claw fingertips being between 0.7-fold and 1.0-fold the axial core-body length.

22. The polyphase electrical machine according to claim 15, wherein the claw fingers include a chamfer at least one of edges that lead and edges that trail with respect to a direction of rotation.

23. The polyphase electrical machine according to claim 1, wherein a ratio of a yoke height to a circumference of the stator is less than 0.015.

24. The polyphase electrical machine according to claim 12, further comprising:
    at least one radial-flow fan mounted at an axial end face of the rotor, the radial-flow fan generating a predominantly radial air flow directed toward a part of the winding-head connections of the windings forming two winding heads.

25. The polyphase electrical machine according to claim 17, wherein the windings are interconnected, the interconnection being disposed in one of a vicinity of a winding head and in the rectifier.

26. The polyphase electrical machine according to claim 24, wherein the windings are interconnected at interconnection points, at least two windings to be interconnected emerging from adjacent slots.

27. The polyphase electrical machine according to claim 1, wherein the polyphase electrical machine is a polyphase generator.

28. A method for producing a polyphase electrical machine, including a stator including a core body having a circumferential slot pitch, and a winding configuration having a plurality of windings forming phases, the number of phases being five, the method comprising:
    mounting sequentially a number of windings corresponding to one of the number of phases and a multiple of the number of phases in the core body, the windings having winding sections that lie in assigned slots; and between the winding sections that lie in assigned slots, in each case, forming a winding-head connection, the winding-head connections of the individual windings being disposed radially in layers relative to each other.

29. The method according to claim 28, wherein a number of radial positions corresponds to the number of phases.

30. The method according to claim 28, wherein the windings are simple windings.

31. The method according to claim 30, wherein a slot offset amounts to 5*m+4 slots, m being one of integrally greater than and equal to 0.

32. The method according to claim 28, wherein the windings are distributed windings.

33. The method according to claim 32, wherein a slot offset amounts to 5*m+1 slots, m being one of integrally greater than or equal to 0.

34. The method according to claim 28, wherein the windings are in the form of one of lap windings and wave windings.

35. The method according to claim 28, further comprising:
insertion of the windings in layers into a plane laminated stator core having two laminated-stator-core ends;
bending round of the laminated stator core together with inserted windings; and
integral joining of the two laminated-stator-core ends, a cylindrical core body of the stator being obtained.

36. The method according to claim 35, wherein the winding-head connections form winding heads which are stamped prior to the insertion of the windings into the plane stator core, and assume a predefined form due to the stamping, a total height of all windings layered together corresponding approximately to a slot depth.

37. The method according to claim 35, further comprising:
prior to the insertion of the windings into the plane stator core, stamping the winding sections of the windings and thereby assuming a predefined form adapted to a slot cross-section.

38. The method according to claim 28, further comprising:
prefabricating the windings from at least one continuous winding wire into a form of essentially flat, ring-shaped winding units;
shaping of the ring-shaped winding units into star-shaped winding units having winding sections, between which in each case a winding-head connection is formed; and
successive mounting of the windings that are radially directly adjacent in the winding head, into slots of a cylindrical core body, the windings being shifted relative to each other by a predefined number of slot pitches.

39. The method according to claim 38, further comprising:
splitting the star-shaped winding units essentially into two halves; and
twisting relative to each other by one pole pitch, thereby obtaining winding units for distributed windings.

* * * * *

UNITED STATES PATENT AND TRADEMARK OFFICE
CERTIFICATE OF CORRECTION

PATENT NO.        : 8,368,276 B2                                                        Page 1 of 1
APPLICATION NO.   : 12/305816
DATED             : February 5, 2013
INVENTOR(S)       : Wolf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 861 days.

Signed and Sealed this

First Day of September, 2015

Michelle K. Lee
*Director of the United States Patent and Trademark Office*